(12) United States Patent
Yao et al.

(10) Patent No.: US 12,228,814 B2
(45) Date of Patent: Feb. 18, 2025

(54) DISPLAY PANEL AND FABRICATION METHOD THEREOF, AND DISPLAY DEVICE

(71) Applicant: Shanghai Tianma Micro-Electronics Co., Ltd., Shanghai (CN)

(72) Inventors: Yuan Yao, Shanghai (CN); Zhiyuan Zhang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 175 days.

(21) Appl. No.: 17/971,095

(22) Filed: Oct. 21, 2022

(65) Prior Publication Data

US 2024/0004232 A1 Jan. 4, 2024

(30) Foreign Application Priority Data

Jun. 29, 2022 (CN) .......................... 202210784863.7

(51) Int. Cl.
*G02F 1/1335* (2006.01)
*G02F 1/1368* (2006.01)

(52) U.S. Cl.
CPC .................. *G02F 1/133502* (2013.01); *G02F 1/133512* (2013.01); *G02F 1/133514* (2013.01); *G02F 1/1368* (2013.01)

(58) Field of Classification Search
CPC ......... G02F 1/133514; G02F 1/133502; G02F 1/133512; G02F 1/1368; G02F 1/1334; G02F 1/133615; G02F 1/136227; G02F 1/134309; G02F 1/136286; G02F 1/13439; G02F 1/136209; H01L 27/1218; H01L 27/1262; H01L 27/1225; H01L 29/7869; H01L 27/1244; H01L 29/4908; H01L 27/12; H01L 27/1248; H01L 29/78675; H01L 21/77; H01L 29/4238; G02B 1/11; H10K 59/123; H10K 59/1213

See application file for complete search history.

(56) References Cited

U.S. PATENT DOCUMENTS 5,342,675 A * 8/1994 Kobayashi .......... C03C 17/3435
  428/428
2005/0122447 A1* 6/2005 Shiota ............... G02F 1/136209
  349/110

(Continued)

FOREIGN PATENT DOCUMENTS

JP    2018109723 A  * 7/2018 ....... G02F 1/133345
KR    20160001876 A  *  1/2016

*Primary Examiner* — Hoan C Nguyen
(74) *Attorney, Agent, or Firm* — Anova Law Group, PLLC

(57) ABSTRACT

A display panel and a method for forming a display panel and a display device are provided. The display panel includes a substrate structure including a first substrate; a first structure layer including at least one first film layer located on a side of the first substrate adjacent to a light-exiting surface of the display panel, and a second structure layer located on a side of the first structure layer away from the substrate structure. The substrate structure is adjacent to and in contact with the first structure layer, and the second structure layer is adjacent to and in contact with the first structure layer. An average refractive index of the substrate structure is n1, an average refractive index of the first structure layer is n2, a refractive index of the second structure layer is n3, and n1<n2<n3.

26 Claims, 22 Drawing Sheets

(56) References Cited

U.S. PATENT DOCUMENTS

| | | | |
|---|---|---|---|
| 2007/0090457 A1* | 4/2007 | Lee | H01L 27/12 |
| | | | 438/149 |
| 2009/0225103 A1* | 9/2009 | Shiomi | G09G 3/3607 |
| | | | 345/87 |
| 2013/0021550 A1* | 1/2013 | Watakabe | G02F 1/136209 |
| | | | 349/61 |
| 2014/0021473 A1* | 1/2014 | Yu | H01L 29/78633 |
| | | | 257/66 |
| 2021/0335832 A1* | 10/2021 | Mo | H01L 27/1218 |

* cited by examiner

DISPLAY PANEL AND FABRICATION METHOD THEREOF, AND DISPLAY DEVICE

CROSS-REFERENCE TO RELATED APPLICATION

This application claims the priority of Chinese Patent Application No. 202210784863.7, filed on Jun. 29, 2022, the content of which is incorporated by reference in its entirety.

TECHNICAL FIELD

The present disclosure generally relates to the field of display technologies and, more particularly, relates to a display panel and a method for forming a display panel, and a display device.

BACKGROUND

At present, display technologies have penetrated into all aspects of people's daily life, and accordingly, more and more materials and technologies are used in display devices. As an important component of a display device, a display panel is used to realize the display function of the display device. The mainstream display panels mainly include liquid crystal display (LCD) panels and organic light-emitting display panels (OLEDs).

Liquid crystal display panels have the advantages of small thickness, low power consumption, and low radiation, and are widely used in various fields. The liquid crystal display panel usually has a color filter substrate and an array substrate oppositely arranged, and a liquid crystal layer between the color filter substrate and the array substrate. The side of the color filter substrate adjacent to the array substrate is provided with a black matrix and a color resist layer. The electric field between the pixel electrodes in the array substrate and the common electrode can deflect the liquid crystal molecules. After the liquid crystal molecules are deflected, the light generated by the backlight assembly will pass through the display panel. By adjusting the electric field, the degree of deflection is different. When the degree of deflection is different, the light transmittance of the display panel is different, and the amount of light transmitted by the backlight assembly through the liquid crystal display panel is different, thereby realizing image display.

OLED display panels have many excellent characteristics, such as self-illumination, wide viewing angle, fast response speed, high contrast ratio, wide color gamut, low energy consumption, thin panel, rich color, flexible display, and wide operating temperature range, etc. Thus, they are called the next generation of "star" flat panel display technologies. The OLED display panel has an anode and a cathode, a hole transport layer, an organic light-emitting layer and an electron transport layer arranged between the anode and the cathode. The anode provides a hole injection, and the cathode provides an electron injection. The holes and electrons injected by the cathode and anode recombine in the organic light-emitting layer to form electron-hole pairs (i.e., excitons) at the bound energy level under the drive of external electric field. The exciton radiation de-excites photons to produce visible light.

However, the current the display panels have problems of visual greening and poor integrated black effect. Therefore, there is an urgent need to provide a display panel that may be able to solve the visual greening problem and simultaneously improve the integrated black performance. The present disclosed display panels, methods for forming the display panels and display devices are direct to solve one or more problems set forth above and other problems in the arts.

SUMMARY

One aspect of the present disclosure provides a display panel. The display panel includes a plurality of pixels. A pixel of the plurality of pixels includes a light-transmitting area, the pixel at least includes a first sub-pixel, a second sub-pixel and a third sub-pixel, a first color resist is disposed in the first sub-pixel, a second color resist is disposed in the second sub-pixel, a third color resist is disposed in the third sub-pixel, and the first color resist is a green color resist. The display panel also includes a substrate structure. The substrate structure includes a first substrate. Further, the display panel includes a first structure layer located on a side of the first substrate adjacent to a light-exiting surface of the display panel. The first structure layer includes at least one first film layer. Further, the display panel includes a second structure layer located on a side of the first structure layer away from the substrate structure. The substrate structure is adjacent to and in contact with the first structure layer, and the second structure layer is adjacent to and in contact with the first structure layer; and an average refractive index of the substrate structure is n1, an average refractive index of the first structure layer is n2, a refractive index of the second structure layer is n3, and n1<n2<n3.

Another aspect of the present disclosure provides a display device. The display device includes a display panel. The display panel includes a plurality of pixels. A pixel of the plurality of pixels includes a light-transmitting area, the pixel at least includes a first sub-pixel, a second sub-pixel and a third sub-pixel, a first color resist is disposed in the first sub-pixel, a second color resist is disposed in the second sub-pixel, a third color resist is disposed in the third sub-pixel, and the first color resist is a green color resist. The display panel also includes a substrate structure. The substrate structure includes a first substrate. Further, the display panel includes a first structure layer located on a side of the first substrate adjacent to a light-exiting surface of the display panel. The first structure layer includes at least one first film layer. Further, the display panel includes a second structure layer located on a side of the first structure layer away from the substrate structure. The substrate structure is adjacent to and in contact with the first structure layer, and the second structure layer is adjacent to and in contact with the first structure layer; and an average refractive index of the substrate structure is n1, an average refractive index of the first structure layer is n2, a refractive index of the second structure layer is n3, and n1<n2<n3.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

DETAILED DESCRIPTION

Various exemplary embodiments of the present disclosure will now be described in detail with reference to the accompanying drawings. It should be noted that the relative arrangement of components and steps, the numerical expressions and numerical values set forth in these embodiments do not limit the scope of the disclosure unless specifically stated otherwise.

The following description of at least one exemplary embodiment is merely illustrative in nature and is in no way intended to limit the disclosure, its application, or uses.

Techniques, methods, and apparatus known to those of ordinary skill in the relevant art may not be discussed in detail, but where appropriate, such techniques, methods, and apparatus should be considered part of the specification.

In all examples shown and discussed herein, any specific values should be construed as illustrative only and not limiting. Accordingly, other instances of the exemplary embodiment may have different values.

It should be noted that like numerals and letters refer to like items in the following figures, so once an item is defined in one figure, it does not require further discussion in subsequent figures.

The present disclosure provides a display panel, a method for forming the display panel, and a display device, which may be used to reduce the visual greening and improve integrated black of the display panel.

Figure 1:
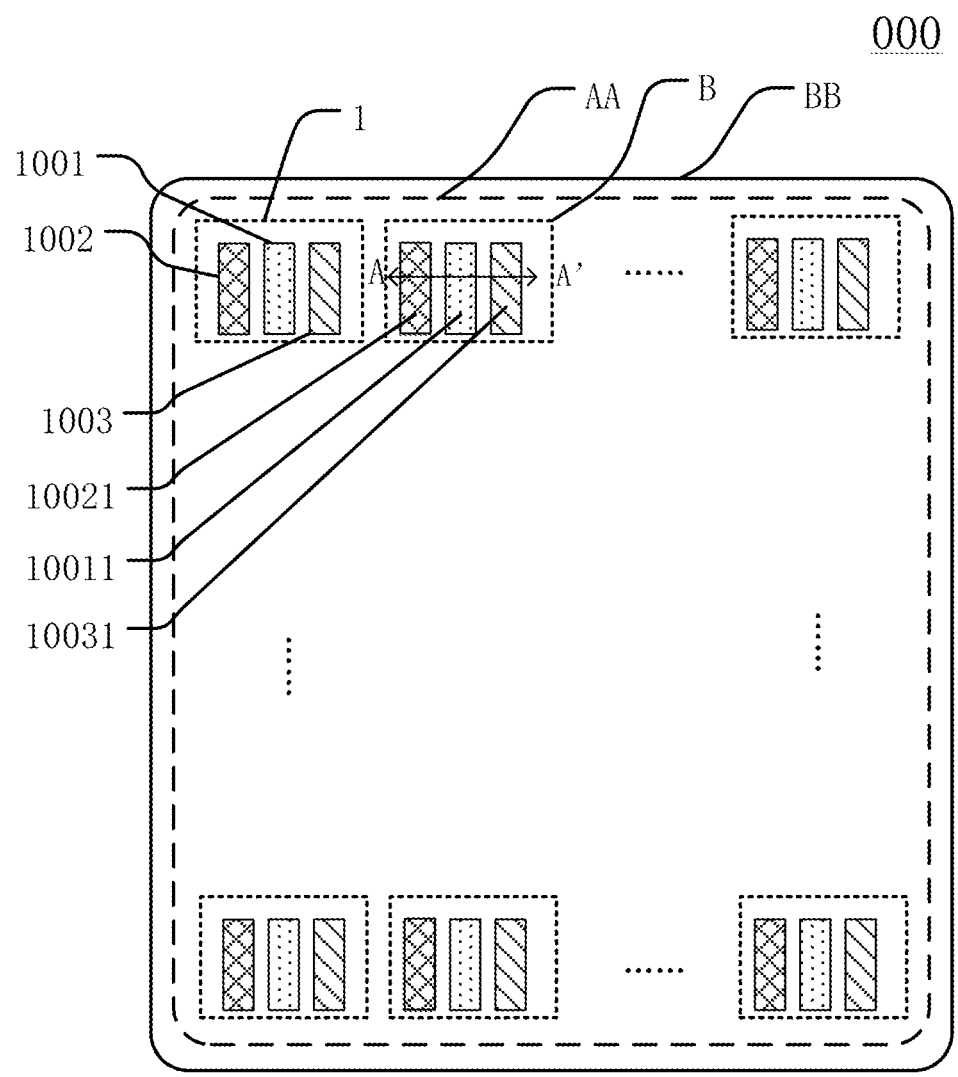
FIG. 1 illustrates an exemplary display panel according to various disclosed embodiments of the present disclosure.
Figure 2:
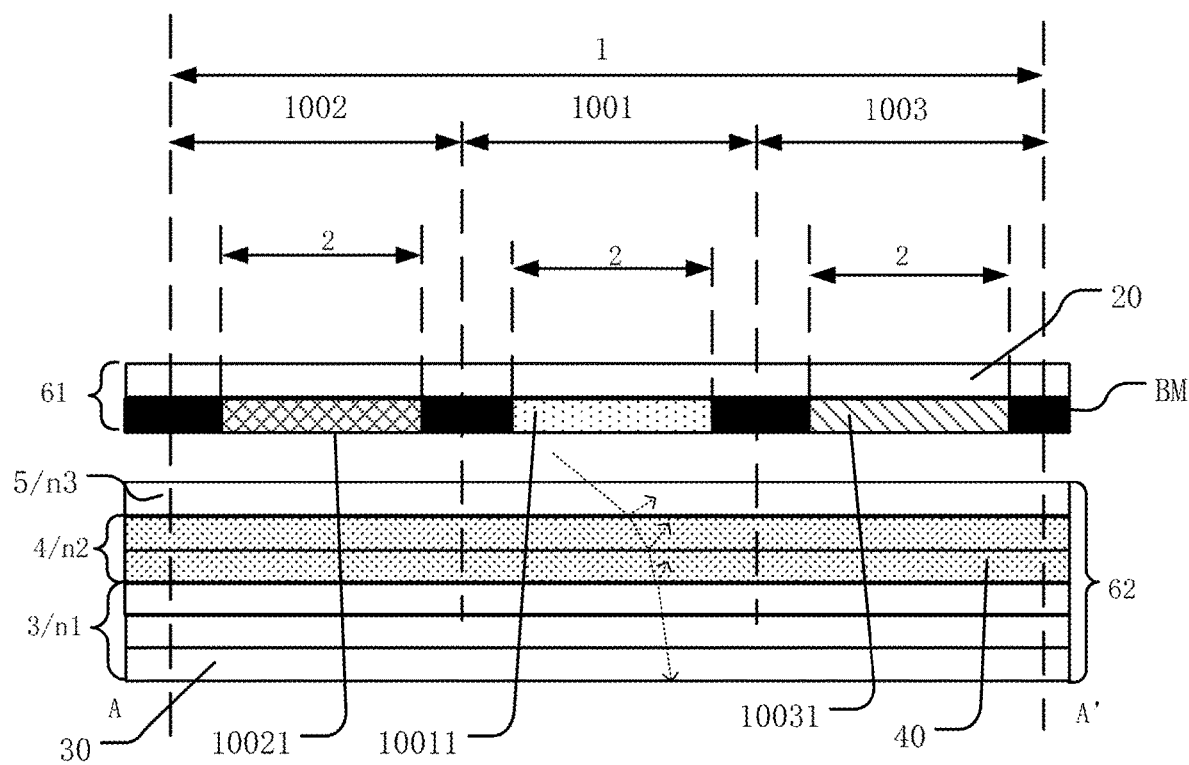
FIG. 2 illustrates an A-A'-sectional view of FIG. 1.

FIG. 1 is a schematic plan view of an exemplary display panel according to various disclosed embodiments of the present disclosure, and FIG. 2 is an A-A'-sectional view of FIG. 1. As shown in FIG. 1 and FIG. 2, the display panel 000 provided in this embodiment may include a plurality of pixels 1. A pixel 1 may include a plurality of light-transmitting area 2, and the pixel 1 may at least include a first sub-pixel 1001, a second sub-pixel 1002 and a third sub-pixel 1003. The first sub-pixel 1001 may be provided with a first color resist 10011, the second sub-pixel 1002 may be provided with a second color resist 10021, and the third sub-pixel 1003 may be provided with a third color resist 10031. The first color resist 10011 may be a green color resist. The display panel 000 may further include a substrate structure 3. The substrate structure 3 may include a first substrate 30 and a first structure layer 4 located on a side of the first substrate 30 adjacent to the light-exiting surface of the display panel 000. The first structure layer 4 may include at least one first film layer 40; and a second structure layer 5 located on the side of the first structure layer 4 away from the substrate structure 3. The substrate structure 3 may be adjacent to and in contact with the first structure layer 4; and the second structure layer 5 may be adjacent to and in contact with the first structural layer 4. The average refractive index of the substrate structure 3 may be n1, the average refractive index of the first structure layer 4 may be n2, the refractive index of the second structure layer 5 may be n3, and n1<n2<n3.

Specifically, the display panel 000 provided in this embodiment may include a plurality of pixels 1. In one embodiment, the plurality of pixels 1 may be arranged in an array. The plurality of pixels 1 may also be arranged in other ways, which are not specified in this embodiment; and may have specific settings according to the display requirements of the display panel 000. The pixel 1 in this embodiment may at least include a first sub-pixel 1001, a second sub-pixel 1002 and a third sub-pixel 1003. In one embodiment, a display panel of the first sub-pixel 1001, the second sub-pixel 1002 and the third sub-pixel 1003 000 may include structures capable of realizing display effects. For example, on one side of the first substrate, a first color resist 10011 may be arranged in the first sub-pixel 1001, a second color resist 10021 may be arranged in the second sub-pixel 1002; and a third color resist 10031 may be arranged in the third sub-pixel 1003. A pixel electrode 7004 may be included on one side of the second substrate, which will not be described in detail in this embodiment. In some embodiments, the second color resist 10021 may be a blue color resist, and the third color resist 10031 may be a red color resist.

In the present disclosure, the first color resist 10011 may be a green color resist with the highest transmittance. The second color resist 10021 may be a blue color resist, and the third color resist 10031 may be a red color resist.

The display panel 000 in this embodiment may be a liquid crystal display panel 000. The film layer structure of the display panel 000 may include a first substrate and a second substrate that are arranged opposite to each other. In one embodiment, the first substrate may be the color filter substrate 61 provided with a structure such as a color resist; and the second substrate may be an array substrate 62 provided with driving circuits such as a transistor T array. When the display panel 000 is a liquid crystal display panel 000, a liquid crystal layer (not shown in the figure) may be further included between the first substrate and the second substrate. When the display panel 000 is the liquid crystal display panel 000, the display panel 000 itself does not emit light, and may mainly control the liquid crystal molecules of the liquid crystal layer between the first substrate and the second substrate by applying a driving voltage to the first substrate and the second substrate to rotate to change the polarization state of the light of the backlight module and to realize the penetration and blocking of the light path by means of the polarizing plate arranged outside the liquid crystal display panel 000 to control the amount of light transmission, and finally the light of the backlight module may be refracted to produce a display screen.

The display panel of the present disclosure may also be an organic light-emitting display panel, which is not shown in the figure. The specific organic light-emitting display panel may include an anode and a cathode, and a hole transport layer, an organic light-emitting layer and an electron transport layer arranged between the anode and the cathode. The anode layer may provide the hole injection, and the cathode may provide the electron injection. Driven by the external voltage, the holes and electrons injected by the cathode and anode may recombine in the organic light-emitting layer to form electron-hole pairs at the bound energy level (i.e., excitation). The exciton radiation may be de-excited to emit photons to produce visible light.

In this embodiment, the side of the first substrate facing the second substrate may include a light-shielding layer, and the material of the light-shielding layer may be an insulating light-shielding material, such as a black matrix material commonly used in the display panel 000. For example, the main component of a traditional black matrix material may include carbon black, dispersant, alkali-soluble resin (polymer), monomer, photo-initiator (initiator), or additive, etc. Conventional black matrix materials may also be called black matrix colloids. It can be understood that the material of the black matrix in this embodiment may include but is not limited to this. In specific implementation, it may also be other insulating light-shielding materials, which will not be repeated in this embodiment. The light-transmitting area 2 of the pixel 1 may be understood as the light-shielding layer including a plurality of openings, the openings may pass through the light-shielding layer in a direction perpendicular to the display panel 000, and a color resist may be provided corresponding to the position of the opening.

It should be noted that the substrate structure 3 in this embodiment may only include the first substrate 30, or may include the first substrate 30 and at least one film layer located on the surface of the first substrate 30. When the substrate structure 3 includes at least one film layer located on the surface of the first base substrate 30 in addition to the first substrate 30, when the refractive indices of the film layers in the substrate structure 3 are equal, the average refractive index of the substrate structure 3 may be equal to the refractive index of each film layer, and the refractive index of each film layer may be different. Here, the average refractive index of the substrate structure 3 may be equal to the equivalent refractive index of multiple film layers. For example, the substrate structure may have two film layers: the first substrate 30 and the second film layer, the refractive index of the first substrate 30 is n301, the refractive index of the second film layer is n302, and n301/n302, D1 is the thickness of the first substrate 30, and D2 is the thickness of the second film layer. According to the calculation of the refractive index formula, it can be deduced that $n1=(D1+D2)\times n1\times n2/(D1n2+D2n1)$. Thus, if the refractive indices of each film in the substrate structure 3 are not equal, the average refractive index may be related to the refractive index and thickness of each film layer in the substrate structure 3. Similarly, the first structure layer 4 may include a plurality of first film layers 40, when the refractive indices of the first film layers 40 of the first structure layer 4 are equal, the average refractive index of the first structure layer 4 may be equal to the refractive index of the first film layers 40, and the refractive indices of the first film layers 40 may be different. The average refractive index of a structure layer 4 may be equal to the equivalent refractive index of the plurality of first layers 40, and the calculation method may be referred to the calculation formula of the equivalent refractive index of the substrate structure, which will not be repeated here. In FIG. 2, only the substrate structure 3 having three film layers, one side of the first substrate 30 including two second film layers, and the first structure layer 4 having two first film layers 40 are used for schematic illustration, the number of film layers in the substrate structure 3 and the number of the first film layers 40 in the first structure layer 4 are not specifically limited here. Structures, such as data lines and scan lines, are not shown in FIG. 1. In FIG. 2, pattern filling is not performed on each film layer of the substrate structure 3 and the first structure layer 4. In one embodiment, in the direction from the substrate structure 3 to the second structure layer 5, the refractive indices of the plurality of first film layers 40 may show an increasing trend.

The display panel in the related art has the problem of visual greening. It has been found that the green color resist has a higher transmittance. For pixels, there are three colors of color resists: green color resist, blue color resist, and red color resist. The ambient light entering the display panel from the outside will pass through the color resist twice. Taking the liquid crystal display panel as an example, the external ambient light will be reflected back through the color filter substrate, the liquid crystal layer, and the array substrate in turn. When the ambient light has a certain transmittance in the color resist, the transmittance of the red color resist, blue color resist and green color resist may be different. The transmittance calculation formula takes the green color resist as an example: $Y=\int \text{green color dividing transmittance} \times v(\lambda) \, d\lambda$. Y is the transmittance of the green color resist, $v(\lambda)$ is the specific sensitivity. Usually, the Y value of the green color resist may be approximately 60%, the Y value of the red color resist may be approximately 20%, and the Y value of the blue color resist may be approximately 10%. Thus, it may be seen that the transmittance of the green color resist is obviously higher, and there may be more green light in the light reflected by the ambient light from the display panel, which may one of the reasons for the visual greening issue. The human eye is most sensitive to green light. When a normal human eye receives green light with a wavelength of 530 nm, as long as 6 photons of green light enter the pupil every second, the eye may detect it. Moreover, the reflectivity of the display panel is relatively high, especially the array substrate has multiple layers, and some layers have large differences in refractive indexes due to different materials. The adjacent interface of two layers with a significant difference in refractive index may have a sudden change of the refractive index, and may make more ambient light to be reflected, and the reflectivity of the display panel may be higher. Therefore, the problem of visual greening may be reduced by reducing the reflectivity of the display panel. For example, by reducing the reflectivity of the display panel, the reflection of the ambient light corresponding to the green color resist may be reduced such that the brightness of the ambient light reflected to the human eye after passing through the display panel may be reduced, thereby reducing the visual greening defect.

In the display panel 000 of the present disclosure, a first structure layer 4 may be disposed between the substrate structure 3 and the second structure layer 5. The substrate structure 3 may include a first substrate 30, and the first structure layer 4 may include at least one first film layer 40. The average refractive index n2 of the first structure layer 4 may be between the average refractive index n1 of the substrate structure 3 and the refractive index n3 of the second structural layer 5, $n1<n2<n3$, such that the first structure layer 4 with refractive index transition may be arranged between the substrate structure 3 and the second structure layers 5. The external ambient light enters the first structure layer 4 through the second structure layer 5 and then enters the substrate structure 3, $r1=(n2-n1)^2/(n2+n1)^2 \times (n3-n2)^2/(n3+n2)^2$, because n3−n2 is less than n3−n1, $(n3-n2)^2/(n3+n2)^2$ may be less than $(n3-n1)^2/(n3+n1)^2$, and $(n2-n1)^2/(n2+n1)^2$ may also have a value less than 1. Thus, r1 may be less than the reflectivity $r2=(n3-n1)^2/(n3+n1)^2$ when no first structure layer 4 is disposed. For example, the reflectivity of the display panel 000 after the first structure layer 4 is set may be less than the reflectivity of the display panel 000 when the first structure layer 4 is not set. In addition, the position for the addition of the first structure layer 4 may need to be determined according to the refractive index difference between the two refractive index mutation layers. The larger the refractive index difference is, the better the effect of reducing the reflectivity after the first structure layer 4 is added. Because of the refractive index of the substrate structure 3 may be generally 1.51, while the refractive index of the material of the second structural layer 5 may be generally 1.86, where the difference in refractive index between the substrate structure 3 and the second structure layer 5 is the largest, thus the difference between the substrate structure 3 and the second structure layer 5 may be the largest. The addition of the first structure layer 4 between the substrate structure 3 and the second structure layer 5 may directly and effectively reduce the reflectivity of the display panel, thereby reducing the overall reflectivity of the display panel 000. Combined with the first reason of visual greening is, the reflection intensity of green light may be significantly reduced. Combined with the second reason, the visual greening problem may be reduced.

In addition, as consumers pursue higher and higher aesthetic needs, there is a requirement to make the color of the light-transmitting area and the shielding area of the display panel consistent in the off-screen state (dark state). Thus, creating a novel, eye-catching, beautiful, and integrated black panel (IBP) with a sense of technology has also become the trend of display panels. When the screen is off, the external ambient light illuminates the display panel, in the light-transmitting area, due to the large difference in the refractive index of some of the film layers of the display panel, the reflection and refraction of light form a black-gray vision, which is different from the black in the shading area (BM), forming a chromatic aberration, thereby affecting the integrated black effect. To determine the integrated black performance of the product, the chromaticity difference ΔE can be used to assist the measurement, $\Delta E=(L1^*-L2^*)^2+(a1^*-a2^*)^2+(b1^*-b2^*)^2$, L*, a*, b* are a color space, L* represents the brightness axis of light (black and white), and its value may be from 0 (black) to 100 (white), a* and b* represent the chromaticity coordinates, a* represents the red-green axis, a*+tends to red, and a*− tends to green. b* represents the yellow-blue axis, b*+tends to yellow, and b*− tends to blue. L1* is the brightness value of the light-shielding area (BM), L2* is the brightness value of the light-transmitting area, and a1* is the red-green degree value of the light-shielding area (BM). a2* is the red-green degree value of the light-transmitting area, b1* is the yellow-blue degree value of the shading area (BM), and b2* is the yellow-blue degree value of the light-transmitting area. When ΔE<2, and the L* value of the light-transmitting area is less than 28, the effect of integrated black may be good. When ΔE≤1, a very good effect of integrated black may be obtained. The existing display panel will turn green in the display area when the screen is off, and the reasons for the turning green may the three reasons for the visual greening as mentioned above, but the user liking the integrated black does not like the greenish color, and prefers neutral color. To improve the performance of the integrated black, in the related art, L1* of the ink area of the glass cover plate on the light-exiting surface side of the display panel may be adjusted to be closer to the L2* of the light-transmitting area. However, the chromaticity values a1* and b1*of the ink area of the cover plate cannot be adjusted (prone to neutral), the main reason is that adjusting the chromaticity values a1* and b1* of the ink area of the cover plate to a neutral color may affect the reliability, and adhesion, etc. Adjusting the difference between L1* and L2* may improve the integrated black effect, but there is still a problem of greening by adjusting the difference between L1* and L2*.

In the present disclosure, because the first structure layer 4 with refractive index transition may be disposed between the substrate structure 3 and the second structure layer 5, the visual greening of the light-transmitting area may be reduced. From the perspective of the color space coordinate axis, the absolute value of a2* of the light-transmitting area 2 may become smaller, and it may be closer to a1* in the shading area (BM), which may be equivalent to the difference between a1*-a2* being close to 0. Accordingly, the square value of a1*-a2* may decrease, and the value of the degree difference ΔE may be reduced. For example, the chromatic aberration between the light-transmitting area 2 of the display panel 000 and the surrounding light-shielding area may be reduced, which may improve the integrated black performance of the display panel 000. It can be understood that the present disclosure may not only reduce the visual greening, but also brings unexpected technical effects, that is, the integrated black performance of the display panel 000 may be improved.

In some embodiments, referring to FIG. 1 and FIG. 2, n1−n2=n2−n3.

For example, the average refractive index of the substrate structure 3 may be n1, and the refractive index of the second structure layer 5 may be n3. According to the above reflectance formula, $r1=(n2-n1)^2/(n2+n1)^2 \times (n3-n2)^2/(n3+n2)^2$. If n2 satisfies n2=(n1+n3)/2, then the value of r1 may be a minimum value, which may reduce the reflectance to the lowest level, may be the best to reduce the problem of visual greening, the integrated black performance of the display panel 000 may be also the best at this time.

In some embodiments, referring to FIG. 1 and FIG. 2, the difference between n1 and n3 is greater than or equal to 0.3.

For example, the materials of each film layer in the display panel 000 may have different refractive indices. As described above, the greater the difference in refractive index between the two film layers, the higher the reflectivity. Of course, if the first structure layer 4 with a refractive index transition is provided between the two film layers at this time, the effect of reducing the reflectivity may be better.

If the difference in refractive index between the substrate structure 3 and the second structure layer 5 is relatively small, then adding the first structure layer 4 between the substrate structure 3 and the first structure layer 4 may not only increase the overall thickness of the display panel 000, and the degree of reflectivity reduction may not be large, that is, the effect of reducing the overall reflectivity of the display panel 000 may not be obvious.

When the difference between the refractive index n1 of the substrate structure 3 and the refractive index n3 of the second structure layer 5 is more than 0.3 (including the end point), the two film layers may be considered to be the refractive index abrupt change layer. If the first structure layer 4 is disposed between the substrate structure 3 and the second structure layer 5, and the refractive index n2 of the first structure layer 4 may be between n1 and n3, the reflectivity may be better reduced.

In some embodiments, referring to FIG. 2, the first structure layer 4 may be disposed on the entire surface.

In one embodiment, the first structure layer 4 may be provided at the position corresponding to the partial light-transmitting area 2 of the display panel 000. The first structure layer 4 may also be disposed on the entire surface of the display panel 000. Corresponding to the manufacture of the display panel 000, the first structure layer 4 may be disposed on the entire surface, which may reduce the difficulty of the manufacturing process, and may be realized without complicated processes. The thickness of the first structure layer 4 may be adjusted to ensure that the overall thickness of the display panel 000 may not be increased too much.

Further, the first structure layer 4 may be arranged on the entire surface of the substrate, the reflectivity of all the light-transmitting regions 2 of the display panel 000 may be reduced. After the overall reflectivity of the display panel 000 is reduced, the problem of visual greening may be further reduced, and the integrated black effect may be improved. Conversely, if the first structure layer 4 is disposed at the position corresponding to the partial light-transmitting area 2 of the display panel 000, only the visual greening problem at some positions may be reduced, and similarly, only a portion of the integrated black effect may be improved.

Figure 3:
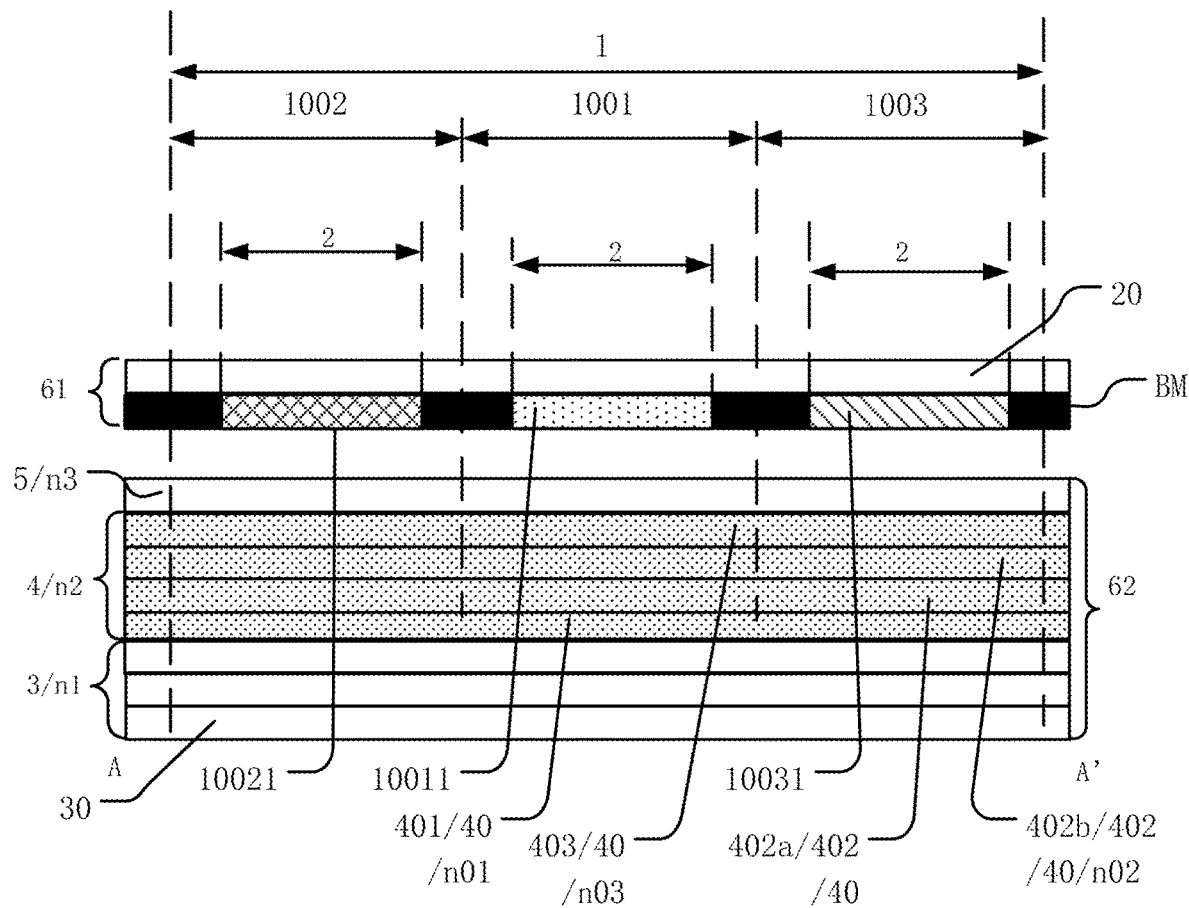
FIG. 3 illustrates another A-A'-sectional view of FIG. 1.

FIG. 3 is another exemplary A-A'-sectional view of FIG. 1. As shown in FIG. 3, in some embodiments, the first structure layer 4 may include a first sub-structure layer 401 and at least one second sub-structure 402 layer and a third sub-structure 403. The first sub-structure 401 may be disposed on the side of the second sub-structure layer 402 adjacent to the substrate structure 3, and the third sub-structure layer 403 may be located on one side of the second sub-structure layer 402 adjacent to the second structure layer 5. The refractive index of the first sub-structure layer 401 may be n01, the average refractive index of the at least one second sub-structure layer 402 may be n02, and the refractive index of the third sub-structure layer 403 may be n03, and n01<n02<n03.

It can be understood that the first structure layer 4 may include at least one first film layer 40, as shown in FIG. 3, may include one first sub-structure layer 401, two second sub-structure layers 402 and one third sub-structure layer 403. The first sub-structure layer 401, the second sub-structure layers 402 and the third sub-structure layer 403 here may be one film layer of the first film layer 40. The second sub-structure layer 402 may be one layer or multiple layers. In the case of multiple layers, the average refractive index of the plurality of second sub-structure layers 402 may be the average value of the sum of the refractive indices of the plurality of second sub-structure layers 402. Of course, in the direction from the substrate structure 3 to the second structure layer 5, the refractive index of the multilayer second structure sub-layer 402 may show an increasing trend. According to the calculation formula of the reflectivity, the effect of reducing the reflectivity may be better.

In FIG. 3, only two second sub-structure layers 402 are taken as an example, the second sub-structure layer 402 may be located on the side adjacent to the substrate structure 3, and the second sub-structure layers 402b may be located on the side adjacent to the second structure layer 5. In one embodiment, the refractive index of the second sub-structure layer 402a and the second sub-structure layer 402b may be gradually changed. For example, the refractive index of the second sub-structure layer 402a may be smaller than the refractive index of the second sub-structure layer 402b, but the average refractive index n02 of the second sub-structure layer 402b may be between n01 and n03, and n01<n02<n03. The refractive index of the second sub-structure layer 402a may be set to be n02a, and the refractive index of the second sub-structure layer 402a may be set to be n02b, the reflectivity of the display panel 000 $r3=(n3-n03)^2/(n3+n03)^2\times(n03-n02b)^2/(n03+n02b)^2\times(n02b-n02a)^2/(n02b+n02a)^2\times(n02a-n01)^2/(n02a+n01)^2\times(n01-n1)^2/(n01+n1)^2$. The reflectivity r3 value may be significantly smaller than $r2=(n3-n1)^2/(n3+n1)^2$, the reflectivity may be further reduced, the problem of visual greening may be further reduced, and the integrated black effect may be improved.

Figure 4:
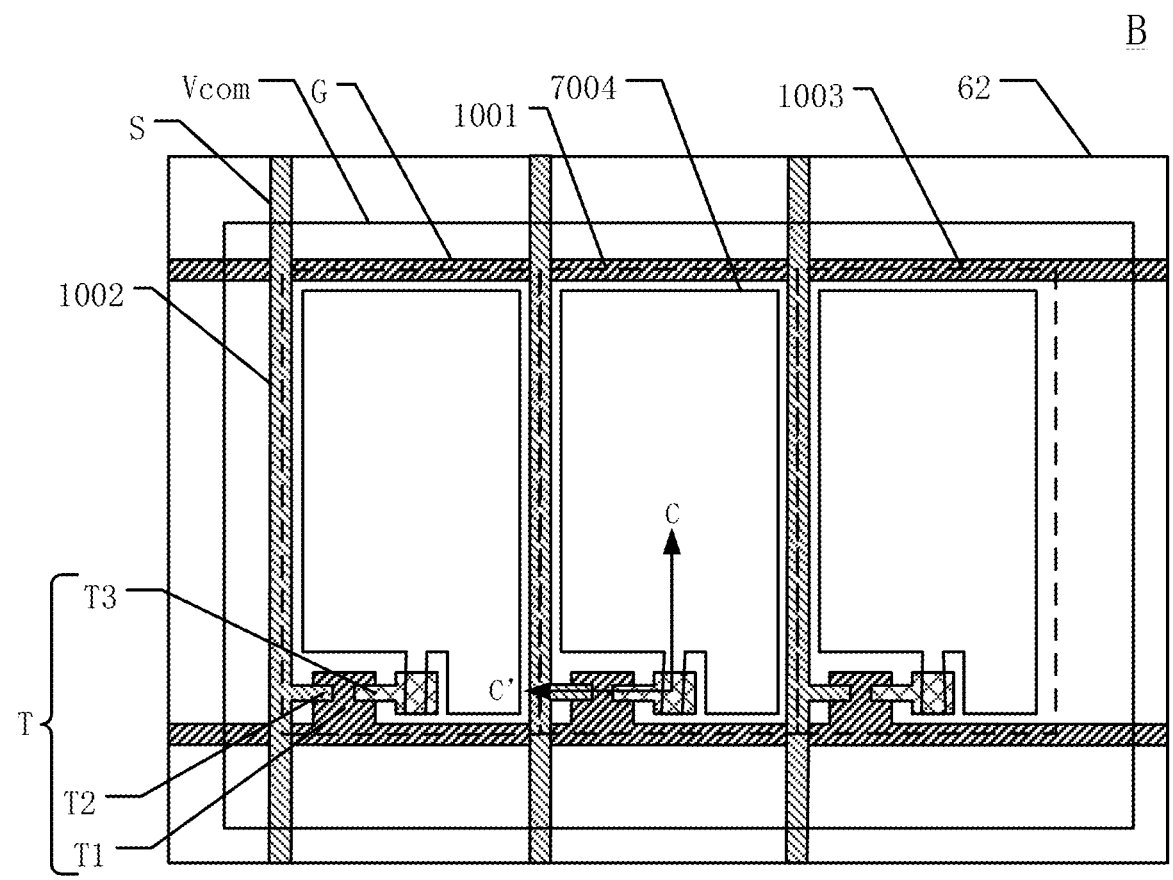
FIG. 4 illustrates a partially enlarged view of region B of FIG. 1.
Figure 5:
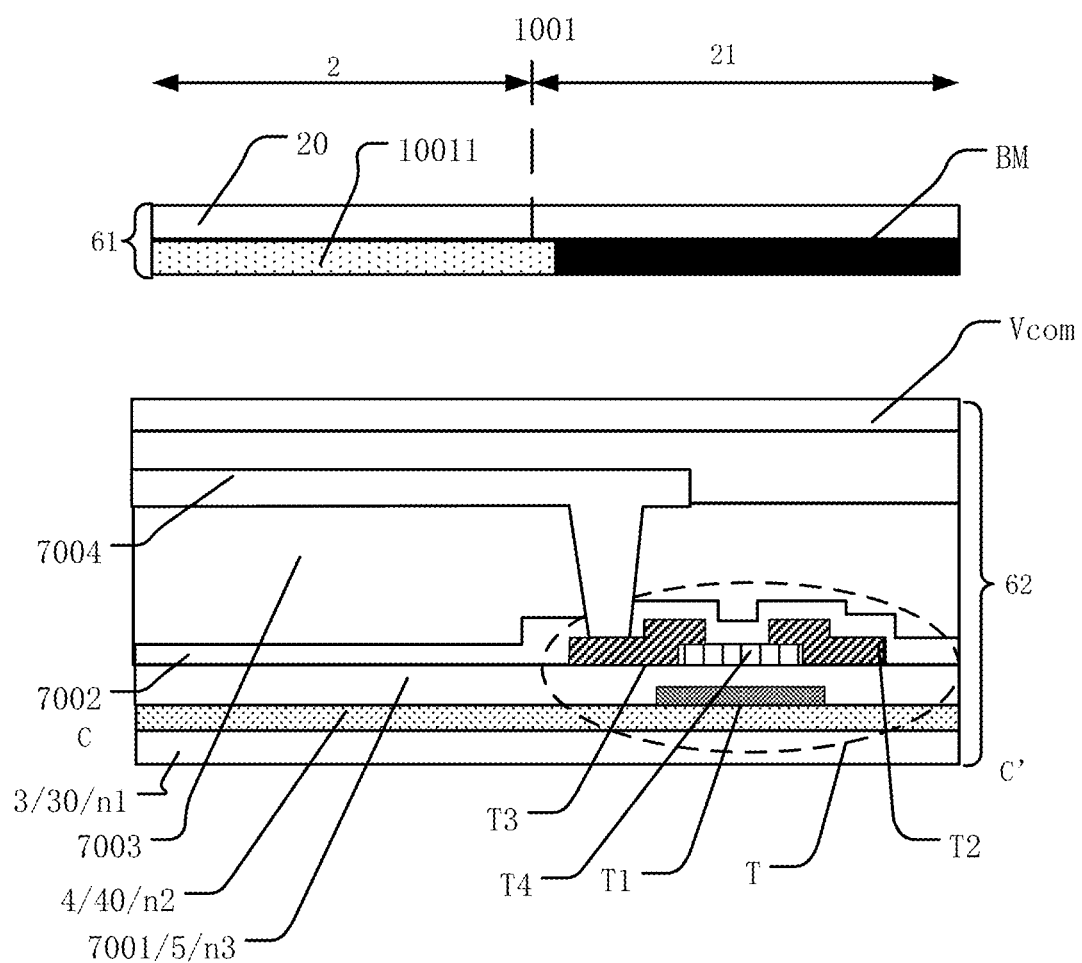
FIG. 5 illustrates a C-C'-sectional view of FIG. 4.

FIG. 4 is a partial enlarged view of region B in FIG. 1, FIG. 5 is a C-C'-sectional view of FIG. 4. As shown in FIG. 4 and FIG. 5, the light-transmitting area 2 of the first sub-pixel of 1001 may include a first gate insulation layer 7001 located on the side of the first structure layer 4 adjacent to the light-exiting surface of the display panel 000, and the first gate insulation layer 7001 may be the second structure layer 5.

Specifically, in this embodiment, the substrate structure 3 may only include the first substrate 30, and the first gate insulation layer 7001 may be the second structure layer 5. The array substrate 62 may usually include a first substrate 30 and a driving circuit disposed on the first substrate 30. When fabricating the transistor T of the driving circuit, a first gate insulation layer 7001 may need to be fabricated, and at this time, the first gate insulation layer 7001 may not only be provided in the non-transmitting area covered by the black matrix, but also exist in the light-transmitting area 2. For the first substrate 30, the material may generally be glass. For the first gate insulation layer 7001, the material may not only need to play an insulation role, but also need to be able to function as a conductive channel in the transistor switch. Therefore, the material of the first gate insulation layer 7001 may generally be inorganic silicon, such as silicon nitride. Because silicon nitride may be formed by a chemical vapor deposition (CVD) method, the quality of the film may be as desired. The refractive index of glass may be quite different from that of silicon nitride, for example, the refractive index may be abruptly changed at the position of the first substrate 30 and the first gate insulation layer 7001. Thus, the ambient light may be more likely to be refracted and reflected at this position, and the reflectivity may be higher.

In one embodiment, the first structure layer 4 may be arranged on the entire surface, and the entire surface arrangement here means that, except for the light-transmitting area 2 corresponding to the first sub-pixel 1001, the light-transmitting area 2 corresponding to the second sub-pixel 1002 and the third sub-pixel 1003 may all be arranged with the first structure layer 4. Such a configuration may reduce the overall reflectivity of the display panel 000 and may also facilitate to the production. For the non-transmitting area 21 around the light-transmitting area 2, the first structure layer 4 may be provided or may not be provided. Because there may be no light reflection in the non-transmitting area 21 and no contribution to the reflectivity, so whether to provide the first structure layer 4 in the non-transmitting area 21 may not be specifically limited. The first structure layer 4 may also be arranged in the non-transmitting area 21, it may need to be arranged at a local location.

In one embodiment, the display panel 000 in this embodiment may be a display panel 000 with a-Si as a base material, and a-Si is an amorphous silicon technology, which has the advantages of simple technology and low cost, and is therefore widely used.

The structure of the color filter substrate 61 is not shown in FIG. 4, especially the structures of the first color resist 10011, the second color resist 10021, the third color resist 10031, and the light-shielding layer BM in the color filter substrate 61 are not shown. The display panel 000 in FIG. 5 may further include a transistor T, which may be located in the non-transmitting area 21 of the pixel 1 and may be electrically connected to the pixel electrode 7004 in the pixel 1. The transistor T may include a gate T1, an active layer T4, a source T2, and a drain T3. The active layer T4 may be located on the side of the gate T1 away from the first substrate 30. The source T2 and the drain T3 may be located on the side of the active layer T4 away from the first substrate 30. A first gate insulation layer 7001 may be located between the active layer T4 and the gate T1. A first insulation layer 7002 and a fourth structure layer 7003 may be included between the source T2 and the drain T3 and the pixel electrode 7004. The first insulation layer 7002 may play the role of insulation, and the fourth structure layer 7003 may play the role of planarization. Specifically, the scan line and the data line are also shown in FIG. 4, and the common electrode Vcom is also shown in FIG. 4. The common electrode Vcom can be located on the side of the pixel electrode 7004 adjacent to the light-exiting surface of the display panel 000. An insulation layer may be required between the pixel electrode 7004 and the common electrode Vcom. During display, when the signal of the scan line is transmitted to the gate T1 of the transistor T, the transistor T may be controlled to be turned on, and the data signal transmitted by the data line may be transmitted to the pixel electrode 7004, the voltage between the pixel electrode 7004 and the common electrode Vcom may form an electric field that drives the liquid crystal molecules to deflect. In this embodiment, a first structure layer 4 with a refractive index transition may be disposed between the first substrate 30 with an abrupt refractive index and the first gate insulation layer 7001. According to the reflectivity formula, the reflectivity of the display panel 000 may be reduced. Thus, the problem of visual greening may be reduced, and the integrated black effect may be improved.

In some embodiments, referring to FIG. 5, the gate T1 may be located on the side of the first gate insulation layer 7001 adjacent to the first structure layer 4.

Specifically, the gate T1 may be located on the side of the first structure layer 4 away from the first substrate 30, that is, only the first gate insulation layer 7001 is required between the gate T1 and the active layer T4. After applying the gate driving signal to the gate T1, the transistor T may respond quickly. On the contrary, if the gate T1 is arranged on the side of the first structure layer 4 adjacent to the first substrate 30, the first gate insulation layer 7001 and the first structure layer 4 are located between the gate T1 and the active layer T4. After applying the gate driving signal to the gate T1, the response of the transistor T may be slow, which may affect the display. On the other hand, the first structure layer 4 may be formed on the entire surface. If the gate T1 is fabricated first and then the first structure layer 4 is fabricated, the gate T1 may be located on the side of the first structure layer 4 adjacent to the first base substrate 30, to avoid affecting the response speed between the gate T1 and the active layer T4, the gate T1 may be exposed by etching the first structure layer 4, which may require an additional mask, the manufacturing process may be more complicated, and the cost may also be increased. If the first structure layer 4 is formed first, the gate T1 may be formed, that is, the gate T1 may be located on the side of the first structure layer 4 adjacent to the first gate insulation layer 7001, the first structure layer 4 may not need to be etched, and there is no need to add an etching mask, the production cost may be reduced, and the manufacturing process may be relatively simplified. The gate T1 may need to be electrically connected to the gate driving circuit (not shown in the figure) around the display panel. Therefore, if the gate T1 is located on the side of the first structure layer 4 adjacent to the first substrate 30, to achieve the electrical connection to the gate driving circuit, and the first structure layer 4 may also need to be etched to expose the gate T1, which may require an additional etching mask. Accordingly, the production cost may be increased, and the process may be more complicated. In one embodiment, the gate T1 may be located on the side of the first structure layer 4 adjacent to the first gate insulation layer 7001, the first structure layer 4 may not not need to be etched, a mask may not need to be added, and the fabrication process may be simpler.

In some embodiments, referring to FIG. 4 and FIG. 5, $1.51<n2<1.86$.

The material of the first substrate 30 may generally be glass, and the material of the first gate insulation layer 7001 may not only need to play an insulation role, but also need to be able to function as a conductive channel in the transistor switch. Thus, the material of the first gate insulation layer 7001 may generally be inorganic silicon, for example, silicon nitride. Silicon nitride may be fabricated by a chemical vapor deposition (CVD) process, and the film quality may be relatively good. The refractive index of glass may be approximately 1.51, while the refractive index of silicon nitride may be 1.86, that is, the refractive index may be abruptly changed at the position of the substrate and the first gate insulation layer. Thus, the ambient light may be more likely to be refracted and reflected at this position, and thus the reflectivity may be higher. Therefore, a first structure layer 4 with a refractive index n2 of 1.51-1.86 may be disposed between the first gate insulation layer 7001 and the first substrate 30. According to the refractive index calculation formula, $r1=(n2-n1)^2/(n2+n1)^2 \times (n3-n2)^2/(n3+n2)^2$, the arrangement of the first structure layer 4 at the position of the sudden change in the refractive index may effectively reduce the visual greening.

Figure 6:
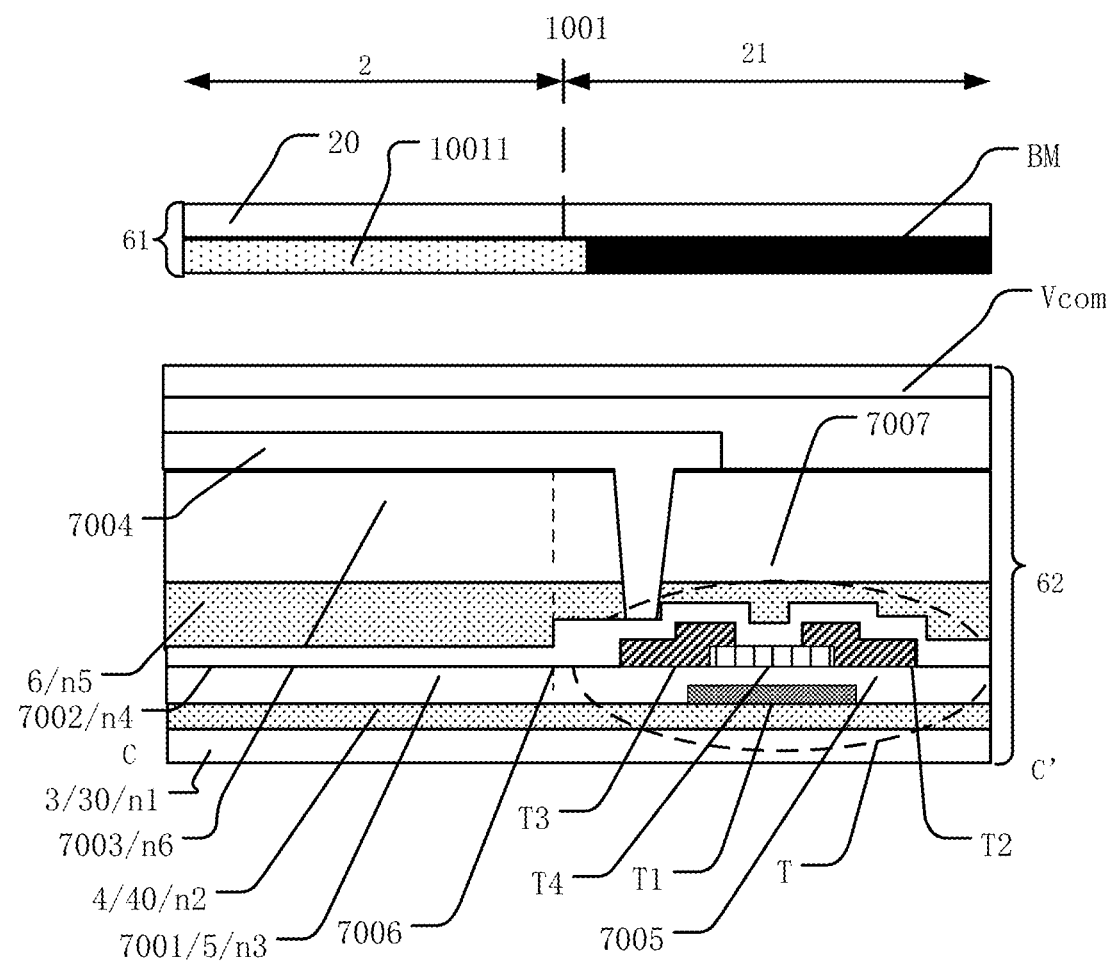
FIG. 6 illustrates another C-C'-sectional view of FIG. 4.

FIG. 6 is another exemplary C-C'-sectional view of FIG. 4. As show in FIG. 6, in some embodiments, the light-transmitting area 2 of the first sub-pixel 1001 may include a first gate insulation layer 7001 located on the side of the first substrate 30 adjacent to the light-exiting surface of the display panel 000; a first insulation layer 7002 located on the side of the first gate insulation layer 7001 adjacent to the light-exiting surface of the display panel 000; a third structure layer 6 on the side of the first insulation layer 7002 adjacent to the light-exiting surface of the display panel 000; and a fourth structure layer 7003 located on the side of the first insulation layer 7002 adjacent to the light-exiting surface of the display panel 000.

The refractive index of the first insulation layer 7002 may be n4. The refractive index of the third structure layer 6 may be n5. The refractive index of the fourth structure layer 7003 may be n6. $n4>n5>n6$.

In one embodiment, the light-transmitting area 2 of the second sub-pixel 1002 and the light-transmitting area 2 of the third sub-pixel 1003 may also include a first gate insulation layer 7001 located on the side of the first substrate 30 adjacent to the light-exiting surface of the display panel 000, which not shown in FIG. 6; the first insulation layer 7002 on the side of the first gate insulation layer 7001 adjacent to the light-exiting surface of the display panel 000; and the third structure layer 6 on the side of the first insulation layer 7002 adjacent to the light-exiting surface of the display panel 000. The third structure layer 6 may also not be provided, and no specific limitation is made here. The first insulation layer 7002, the third structure layer 6 and the fourth structure layer 7003 may be provided on the entire surface, which is not specifically limited here.

In one embodiment, the display panel 000 in this embodiment may be a display panel 000 with a-Si as a base material.

The material of the first insulation layer 7002 may be an inorganic material, such as silicon oxide ($SiO_x$), silicon nitride ($SiN_x$), silicon oxynitride ($SiO_xN_y$) and other inorganic materials. The thickness of the first insulation layer 7002 may be generally several hundreds of nanometers, for example, it may be in a range of approximately 100 nm-400 nm. The fourth structure layer 7003 may need to play a role of planarization, and its thickness may be thicker than that of the first insulation layer 7002, generally reaching several thousand nanometers, and the film produced by the CVD method may not reach the thickness. Therefore, the organic material that can be coated and formed into a film may be generally selected, mainly because the organic material may have a good flat shape after the film formation, may be easy to form a film, and may have a simple process.

In one embodiment, the first structure layer 4 with a refractive index transition may still be disposed between the first substrate 30 and the first gate insulation layer 7001. In some embodiments, the first structure layer may not be provided, which is not specifically limited here.

In one embodiment, the material of the first insulation layer 7002 in FIG. 6 may be the same as the material of the first gate insulation layer 7001. At this time, the refractive indices of the first insulation layer 7002 and the first gate insulation layer 7001 may be basically the same, thus the interface between the first insulation layer 7002 and the first gate insulation layer 7001 may not be refracted. Accordingly, there may be no need to add a refractive index transition film between the first insulation layer 7002 and the first gate insulation layer 7001.

In one embodiment, the fourth structure layer 7003 may be a planarization layer, for example, a resin material, and the refractive index of the planarization layer and the refractive index of the first insulation layer 7002 may be quite different. Thus, a third structure layer 6 may be added between the fourth structure layer 7003 and the first insulation layer 7002. The refractive index of the first insulation layer 7002 may be n4, the refractive index of the third structure layer 6 may be n5, the refractive index of the fourth structure layer 7003 may be n6; and n4>n5>n6. Thus, the reflectivity at the positions of the fourth structure layer 7003, the third structure layer 6, and the first insulation layer 7002 may be $r4=(n6-n5)^2/(n6+n5)^2 \times (n5-n4)^2/(n5+n4)^2$. In one embodiment, $n6-n5=n5-n4$, the reflectivity at this time is the minimum value, which may reduce the visual greening effect and improve the integrated black performance most. If the first structure layer 4 with a refractive index transition disposed between the first substrate 30 and the first gate insulation layer 7001, the overall reflectivity of the display panel 000 may be $r5=(n2-n1)^2/(n2+n1)^2 \times (n3-n2)^2/(n3+n2)^2 \times (n6-n5)^2/(n6+n5)^2 \times (n5-n4)^2/(n5+n4)^2$. If the first structure layer 4 and the third structure layer 6 are not disposed, the reflectivity of the display panel $r6=(n3-n1)^2/(n3+n1)^2 \times (n6-n4)^2/(n6+n4)^2$, r5 is obviously less than r6, and r5 may also be less than $r2=(n3-n1)^2/(n3+n1)^2$. Thus, the addition of the first structure layer 4 and the third structure layer 6 may further reduce the reflectivity of the display panel 000, reduce the visual greening effect and improve the integrated black performance.

Table 1 is a comparison of the effects of the display panel of the related art and the display panel of the present embodiment.

| | Test number | Visual greening | Refractive index | Integrated black | Improvement ratio of the refractive index | Improvement ratio of the integrated black |
|---|---|---|---|---|---|---|
| Related art | 10 | yes | 0.65 | 3.0 | Improve 15.4% | Improve 53.3% |
| Present disclosure | 10 | no | 0.55 | 1.4 | | |

As shown in Table 1, in the comparative test, the display panel in the related art does not add a first structure layer between the first substrate and the first gate insulation layer, nor does it add a third structure layer between the first insulation layer and the fourth structure layer. In this embodiment, the first structure layer 4 may be disposed between the first substrate and the first gate insulation layer 7001, and a third structure layer 6 may also be disposed between the first insulation layer 7002 and the fourth structure layer 7003. The overall reflectivity of the display panel may be decreased from 0.65 to 0.55, the overall reflectivity of the display panel may be decreased by 15.4%, there may be no problem of visual greening, and the ΔE value of the integrated black may be also decreased from 3.0 to 1.4, and the integrated black performance may be improved by 53.3%.

In some embodiments, referring to FIG. 6, the material of the fourth structure layer 7003 may include an organic material, and the thickness of the fourth structure layer 7003 may be greater than or equal to 1.5 μm and less than or equal to 2.5 μm.

In one embodiment, the fourth structure layer 7003 may be used as a planarization layer, which may be made of organic materials, such as resin materials. Its thickness may be between 1.51 μm and 2.511 μm, for example 21 μm. While playing an insulation role, the structure with a certain thickness may also play a better flattening effect on the film layer of the display panel, reducing the risk of line disconnection of the layout, etc.

In some embodiments, referring to FIG. 6, 1.55<n5<1.86.

In one embodiment, as mentioned above, the first insulation layer 7002 may be an inorganic material, and the refractive index may be usually 1.86, while the refractive index of the fourth structure layer 7003 may be generally 1.55. Thus, it may be enough for the refractive index of the added third structure layer 6 to be greater than 1.55 and less than 1.86. In one embodiment, n5=1.7. Accordingly, the reflectivity may be reduced, the visual greening problem may be reduced, and the integrated black performance may be improved.

Figure 7:
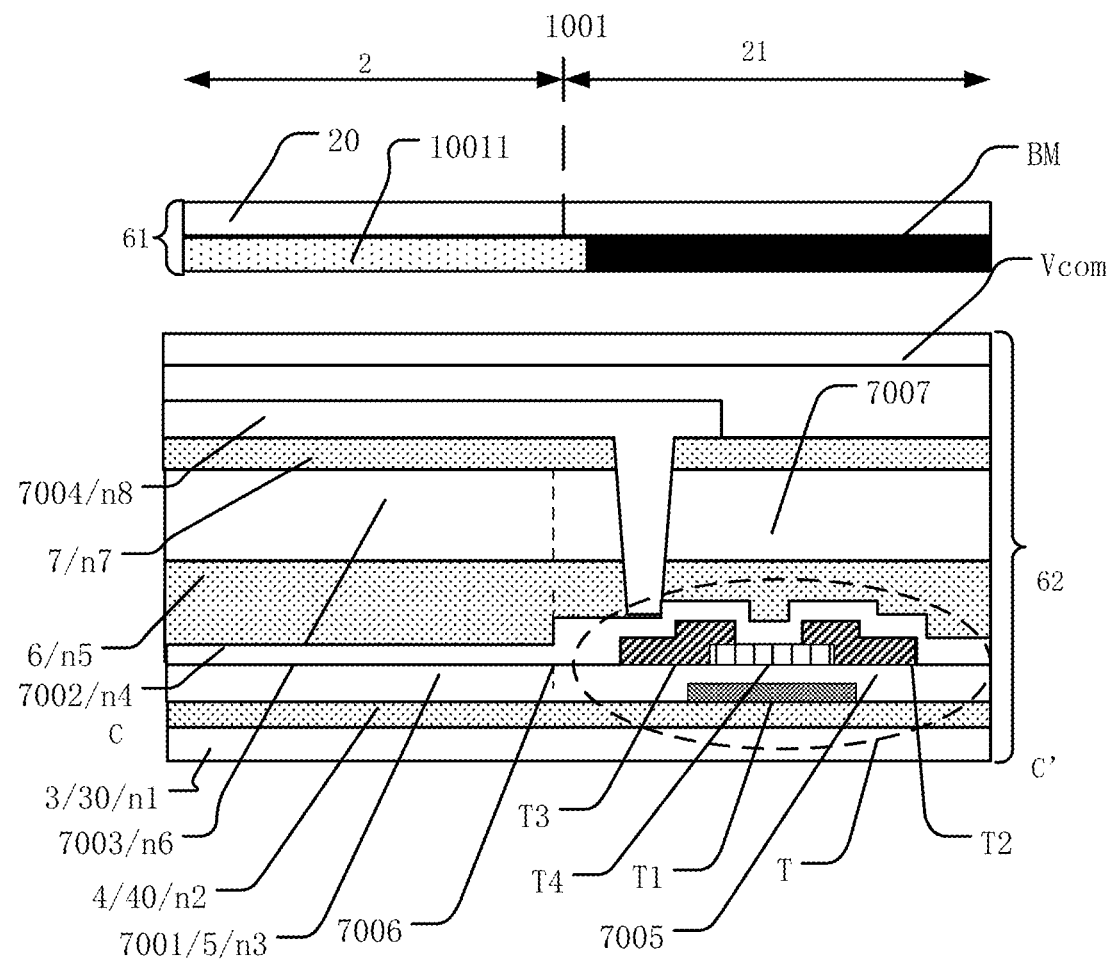
FIG. 7 illustrates another C-C'-sectional view of FIG. 4.

FIG. 7 is another exemplary C-C'-sectional view of FIG. 4. As shown in FIG. 7, in some embodiments, the light-transmitting area 2 of the first sub-pixel 1001 may include the first gate insulation layer 7001 on the side adjacent to the light-exiting surface of the display panel 000; the first insulation layer 7002 on the side of the first gate insulation layer 7001 adjacent to the light-exiting surface of the display panel 000; the fourth structure layer 7003 on the side of the first insulation layer 7002 adjacent to the light-exiting surface of the display panel 000; the fifth structure layer 7 on the side of the fourth structure layer 7003 adjacent to the light-exiting surface of the display panel 000; and the pixel electrode 7004 on the side of the fifth structure layer 7 adjacent to the light-exiting surface 1 of the display panel 000. The refractive index of the fourth structure layer 7003 may be n6, the refractive index of the fifth structure layer 7 may be n7, the refractive index of the pixel electrode 7004 may be n8, and n6<n7<n8.

In one embodiment, the light-transmitting area 2 of the second sub-pixel 1002 and the light-transmitting area 2 of the third sub-pixel 1003 may also include a first gate insulation layer 7001 located on the side of the first substrate 30 adjacent to the light-exiting surface of the display panel 000, not shown in FIG. 7; the first insulation layer 7002 on the side of the first gate insulation layer 7001 adjacent to the light-exiting surface of the display panel 000; the fourth structure layer 7003 on the side of the first insulation layer 7002 adjacent to the light-exiting surface of the display panel 000; the fifth structure layer 7 on the side of the fourth structure layer 7003 adjacent to the light-exiting surface of the display panel 000; and the pixel electrode 7004 on the side of the fifth structure layer 7 adjacent to the light-exiting surface of the display panel 000. For example, the first gate insulation layer 7001, the first insulation layer 7002, the fourth structure layer 7003 and the fifth structure layer 7 may be disposed on the entire surface, which is not specifically limited here.

In one embodiment, the first structure layer 4 may also be disposed between the first substrate 30 and the first gate insulation layer 7001. In some embodiments, the first structure layer 4 may also be disposed between the first insulation layer 7002 and the fourth structure layer 7003. In other embodiments, the third structure layer may not be included, which is not specifically limited here.

Specifically, the material of the fourth structure layer 7003 may be an organic material with a refractive index of about 1.55, the material of the pixel electrode 7004 may be indium tin oxide, and the refractive index of the pixel electrode 7004 may be 1.82. Thus, the fourth structure layer 7003 and the pixel electrode 7004 may have a sudden change in the refractive index, and the refractive index here may be higher. In this embodiment, the fifth structure layer 7 may be disposed between the fourth structure layer 7003 and the pixel electrode 7004, and the refractive index n7 of the fifth structure layer 7 may be between n6 and n8, and n6<n7<n8, the reflectivity value here may be $(n8-n7)^2/(n8+n7)^2 \times (n7-n6)^2/(n7+n6)^2$. If the first structure layer 4 is disclosed between the substrate 30 and the first gate insulation layer 7001 and the third structural layer 6 disposed between the first insulation layer 7002 and the fourth structure layer 7003 at the same time, the reflectivity of the display panel 000 may be $r7=(n2-n1)^2/(n2+n1)^2 \times (n3-n2)^2/(n3+n2)^2 \times (n6-n5)^2/(n6+n5)^2 \times (n5-n4)^2/(n5+n4)^2 \times (n8-n7)^2/(n8+n7)^2 \times (n7-n6)^2/(n7+n6)^2$, the reflectivity may be further reduced at this time. As mentioned above, $r5=(n2-n1)^2/(n2+n1)^2 \times (n3-n2)^2/(n3+n2)^2 \times (n6-n5)^2/(n6+n5)^2 \times (n5-n4)^2/(n5+n4)^2$. Thus, r7 may be smaller than r5, and the visual greening problem of the display panel 000 may be further reduced. At the same time, the integrated black performance may be further improved. In one embodiment, n8−n7=n7−n6, the reflectivity at this time may be the minimum value, the effect of reducing the visual greening and improve the performance of integrated black may be the best.

Figure 8:
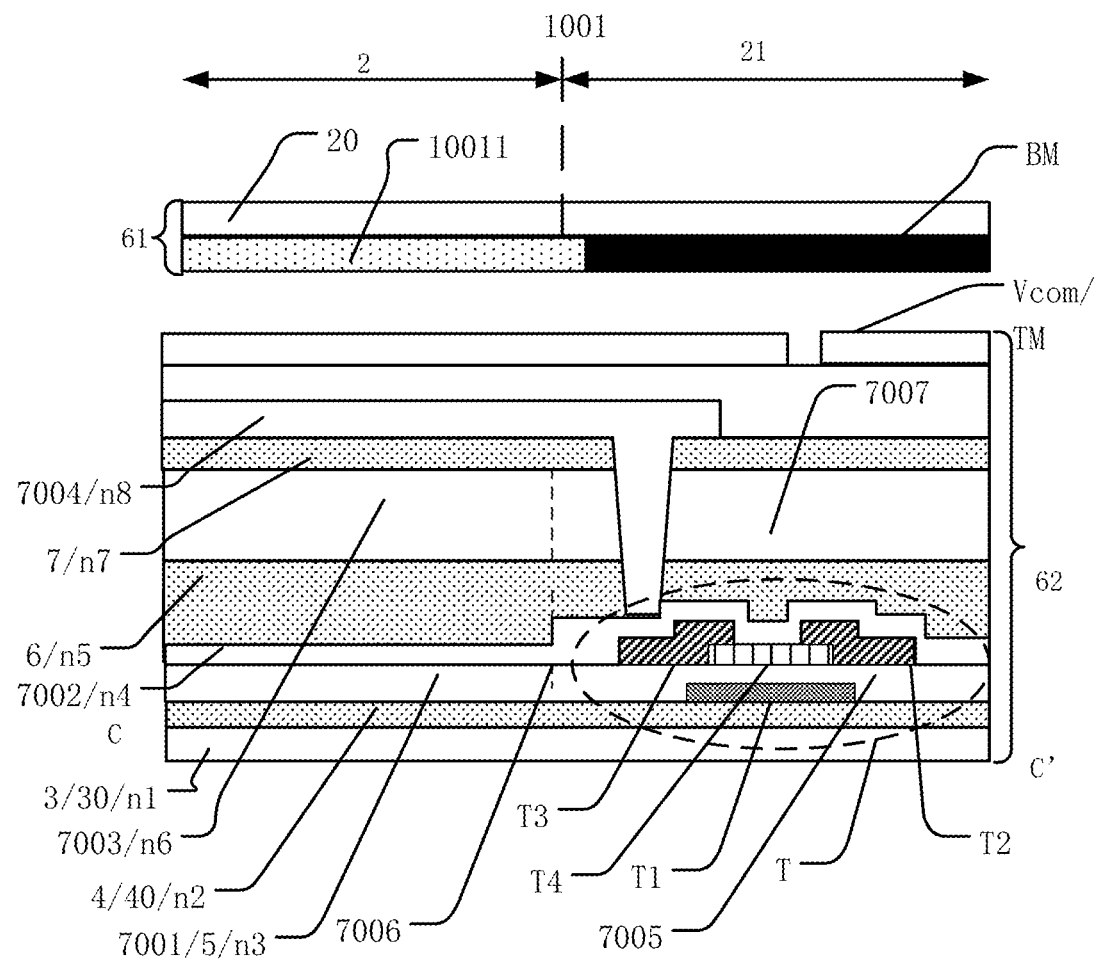
FIG. 8 illustrates another C-C'-sectional view of FIG. 4.

FIG. 8 is another C-C'-sectional view of FIG. 4. To clearly show the structure of the array substrate 62, the color filter substrate 61 is not shown in FIG. 4, especially the structure of the first color resist 10011, the second color resist 10021, the third color resist 10031, and the light-shielding layer BM in the color filter substrate 61 are not shown.

In this embodiment, the display panel 000 may further include a transistor T. The transistor T may be located in the non-transmitting area 21 of the pixel 1 and may be electrically connected to the pixel electrode 7004 in the pixel 1.

The transistor T may include a gate electrode T1, an active layer T4, a source T2, and a drain T3. The active layer T4 may be located on the side of the gate T1 away from the first substrate 30. The source T2 and the drain T3 may be located the side of the active layer T4 away from the first substrate 30. A third insulation layer 7005 may be disposed between the active layer T4 and the gate T1. The third insulation layer 7005 may be the same layer as the first gate insulation layer 7001. A fourth insulation layer 7006 and a fifth insulation layer 7007 may be disposed between the source T2, the drain T3 and the pixel electrode 7004. The fifth insulation layer 7007 and the fourth insulation 7006 may be disposed in a same layer.

Specifically, the scan line and the data line are also shown in FIG. 4, and the common electrode Vcom is also shown in FIG. 4. The common electrode Vcom may be located on the side of the pixel electrode 7004 adjacent to the light-exiting surface of the display panel 000. An insulation layer may be required between the pixel electrode 7004 and the common electrode Vcom. During display, when the signal of the scan line is transmitted to the gate T1 of the transistor T, the transistor T may be turned on, and the data signal transmitted by the data line may be transmitted to the pixel electrode 7004. The voltage between the pixel electrode 7004 and the common electrode Vcom may form an electric field that drives the liquid crystal molecules to deflect. FIG. 8 also shows the touch electrodes TM. The touch electrodes TM may be multiplexed into the common electrodes Vcom. At this time, the common electrodes Vcom may need to be etched to be divided into blocks, and the common electrode signals and the touch signals may be sent to each common electrode in a time-sharing manner. In one embodiment, the first structure layer 4 may be the same layer as the gate electrode T1, so as to not to increase the overall thickness of the display panel 000.

In one embodiment, the third insulation layer 7005 may the same layer as the first gate insulation layer 7001, the fourth insulation layer 7006 may be the same layer as the first insulation layer 7002, and the fifth insulation layer 7007 may be the same layer as the fourth structure layer 7003. Accordingly, the process flow may be saved.

Figure 9:
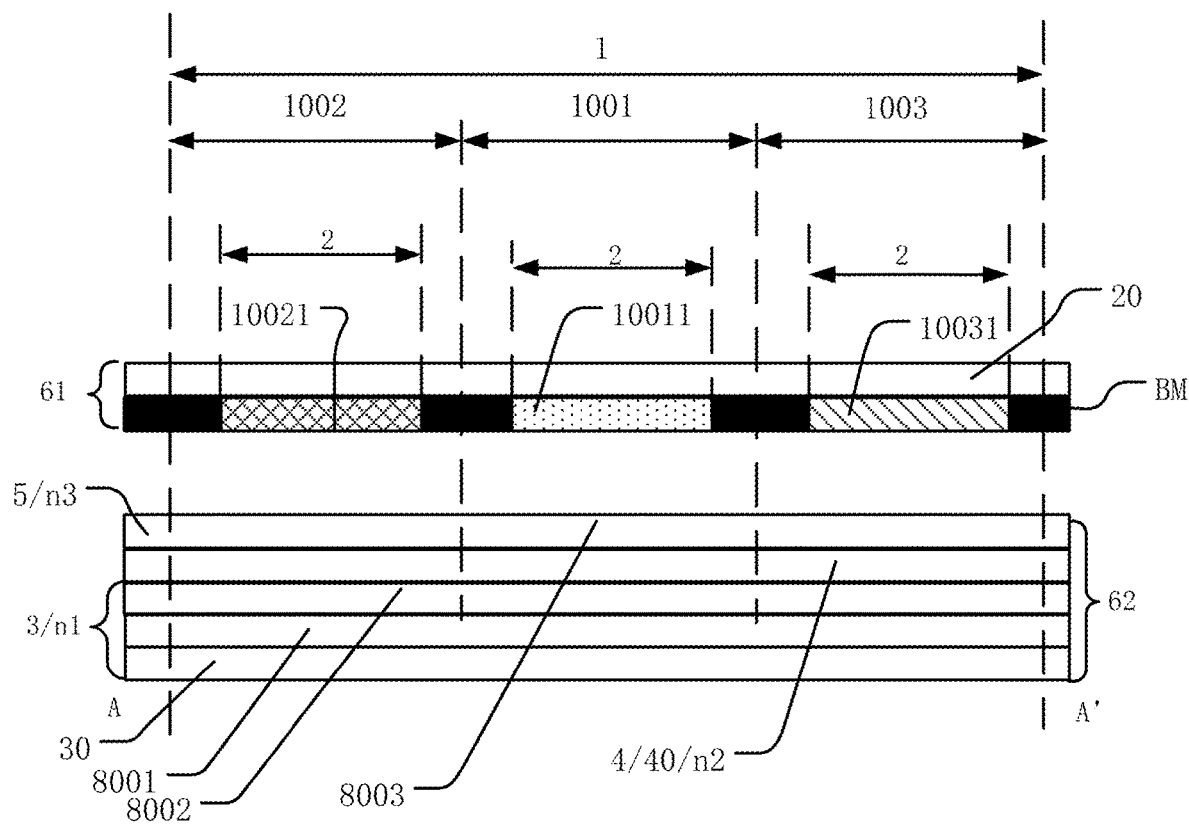
FIG. 9 illustrates another A-A'-sectional view of FIG. 1.
Figure 10:
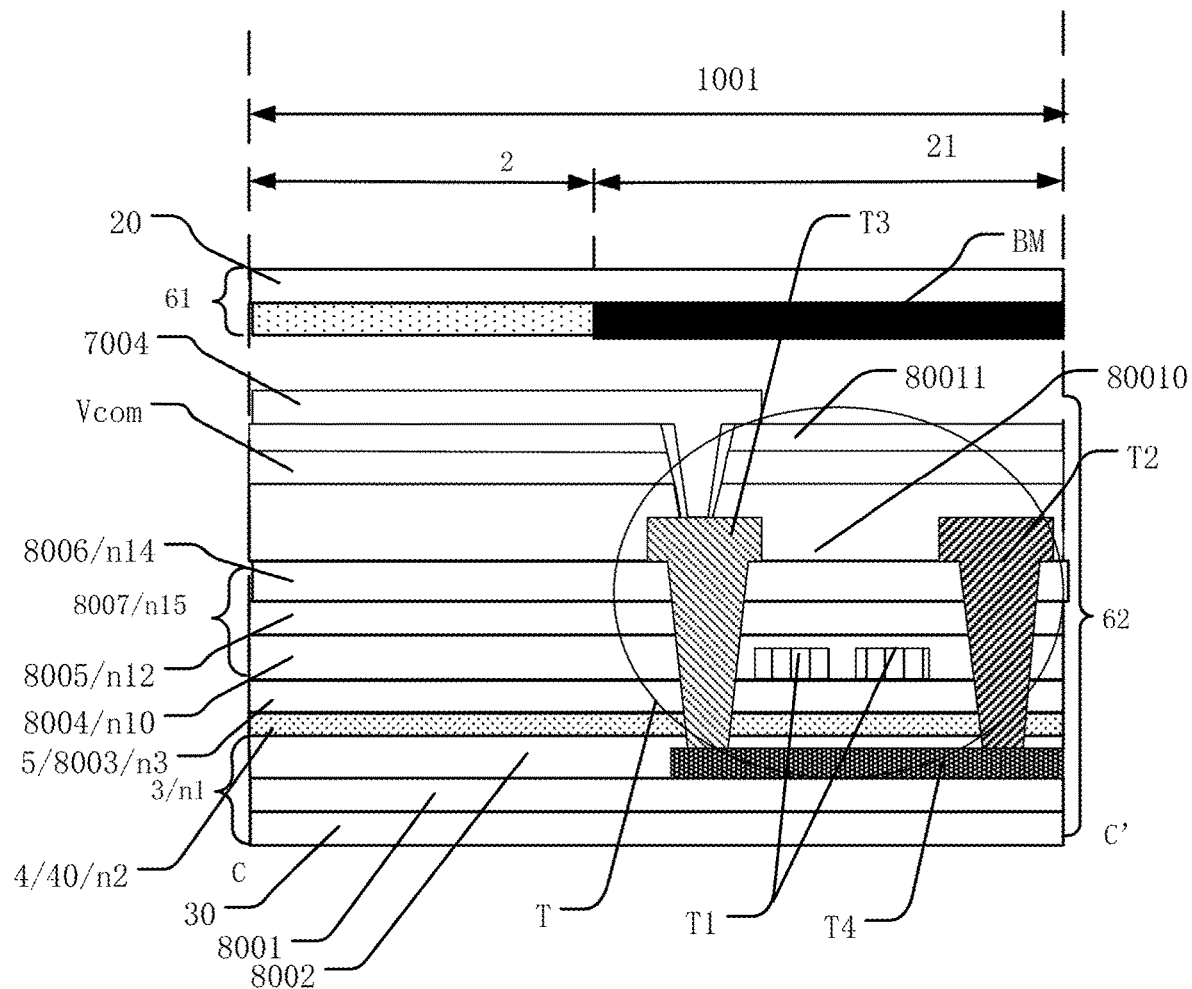
FIG. 10 illustrates another C-C'-sectional view of FIG. 4.

FIG. 9 is another exemplary A-A'-sectional of FIG. 1, and FIG. 10 is another exemplary C-C'-sectional view of FIG. 4. As shown in FIG. 9 and FIG. 10, in some embodiments, the substrate structure 3 may further include a buffer layer 8001 located on the side of the first substrate 30 adjacent to the light-exiting surface of the display panel 000; a first sub-gate insulation layer 8002 on the side of the first substrate 30 adjacent to the light-exiting surface of the display panel 000; a first structure layer 4 located on the side of the first sub-gate insulation layer 8002 adjacent to the light-exiting surface of the display panel 000; and a second sub-gate insulation layer 8003 located on the side of the first structure layer 4 adjacent to the light-exiting surface of the display panel 000. The second sub-gate insulation layer 8003 may be the second structure layer 5.

In one embodiment, the display panel 000 may use the low temperature polysilicon technology (LTPS). The advantages of the LTPS technology may include ultra-thin, ultra-light, and low power consumption, and may provide more vivid colors and clearer image.

Specifically, the material of the first substrate 30 may usually be glass, and its refractive index may be 1.51, while the material of the buffer layer 8001 may usually be one or more of silicon oxide, silicon nitride and other materials. The refractive index of the buffer layer may usually be 1.51. Thus, there is no sudden change in the refractive index between the first substrate 30 and the buffer layer 8001. The material of the first sub-gate insulation layer 8002 may be silicon oxide, and its refractive index may also be 1.51. Thus, there may also be no sudden change in the refractive index between the buffer layer 8001 and the first sub-gate insulation layer 8002. However, for the second sub-gate insulation layer 8003 (the second structure layer 5 in this embodiment), the material for the second sub-gate insulation layer 8003 may not only need to play an insulation role, may but also need to be conductive during the transistor switching; and it may have a conductive channel function. The material of the second sub-gate insulation layer may be usually silicon nitride, and its refractive index is 1.86. Thus, a sudden change in refractive index may occur between the first sub-gate insulation layer 8002 and the second sub-gate insulation layer 8003. A first structure layer 4 may be disposed between the first sub-gate insulation layer 8002 and the second sub-gate insulation layer 8003, and the refractive index of the first structure layer 4 may be between the refractive index of the first sub-gate insulation layer 8002 and the refractive index of the second sub-gate insulation layer 8003, thereby reducing the reflectivity of the display panel 000. The reflectivity calculation method may be $r8=(n2-n1)^2/(n2+n1)^2 \times (n3-n2)^2/(n3+n2)^2$. n1 may refer to the average refractive index of the first substrate 30, the buffer layer 8001 and the first sub-gate insulation layer 8002, and the first structure layer 4 may be the first film layer 40; and the second sub-gate insulation layer 8003 may be the second structure layer 5. Compared with the related art, when the first structure layer 4 is not added, the reflectivity of the display panel is $r10=(n3-n1)^2/(n3+n1)^2$. Because $n3-n2$ is less than $n3-n1$, $(n3-n2)^2/(n3+n2)^2$ is less than $(n3-n1)^2/(n3+n1)^2$, and $(n2-n1)^2/(n2+n1)^2$ may also be a value less than 1, r8 may be less than the reflectivity $r10=(n3-n1)^2/(n3+n1)^2$, wherein the first structure layer 4 is not provided. Thus, the reflectivity of the display panel in this embodiment may be reduced. By reducing the reflectivity of the display panel, the visual greening problem of the LTPS display panel may be decreased, and the integrated black performance may also be improved.

FIG. 10 also shows the first interlayer insulation layer 8004 located on the side of the second sub-gate insulation layer 8003 adjacent to the light-exiting surface of the display panel 000, and a second interlayer insulation layer 8005 located on the side of the first interlayer insulation layer 8004 adjacent to the light-exiting surface of the display panel 000, and a third interlayer insulation layer 8006 on the side of the second interlayer insulation layer 8005 adjacent to the light-exiting surface of the display panel 000. The display panel 000 may further include a transistor T, which may be in the non-transmitting area 21 of the pixel 1. The transistor T may be used to drive the pixel electrode 7004 in the pixel 1. The transistor T may include a gate T1, an active layer T4, a source T2 and a drain T3. The active layer T4 may be located on the side of the buffer layer 8001 away from the first substrate 30. The gate T1 may be located on the side of the active layer T4 away from the first substrate 30. The gate T1 and the active layer T4 may include a first sub-gate insulation layer 8002 and a second sub-gate insulation layer 8003. The source T2 and the drain T3 may be located on the side of the gate T1 away from the first substrate 30. An interlayer insulation layer 8007 may be included between the source T2 and the drain T3 and the gate T1. The side of the interlayer insulation layer 8007 away from the first substrate 30 may include a sixth insulation layer 80010. The side of the sixth insulation layer 80010 away from the first substrate 30 may include a common electrode Vcom. The side of the common electrode Vcom away from the first substrate 30 may include a pixel electrode 7004. A seventh insulation layer 80011 may be included between the common electrode Vcom and the pixel electrode 7004. During display, when the signal of the scan line is transmitted to the gate T1 of the transistor T, the transistor T may be turned on, the data signal transmitted by the data line may be transmitted to the pixel electrode 7004, and the voltage between the pixel electrode 7004 and the common electrode Vcom may form an electric field to deflect the liquid crystal molecules.

Figure 11:
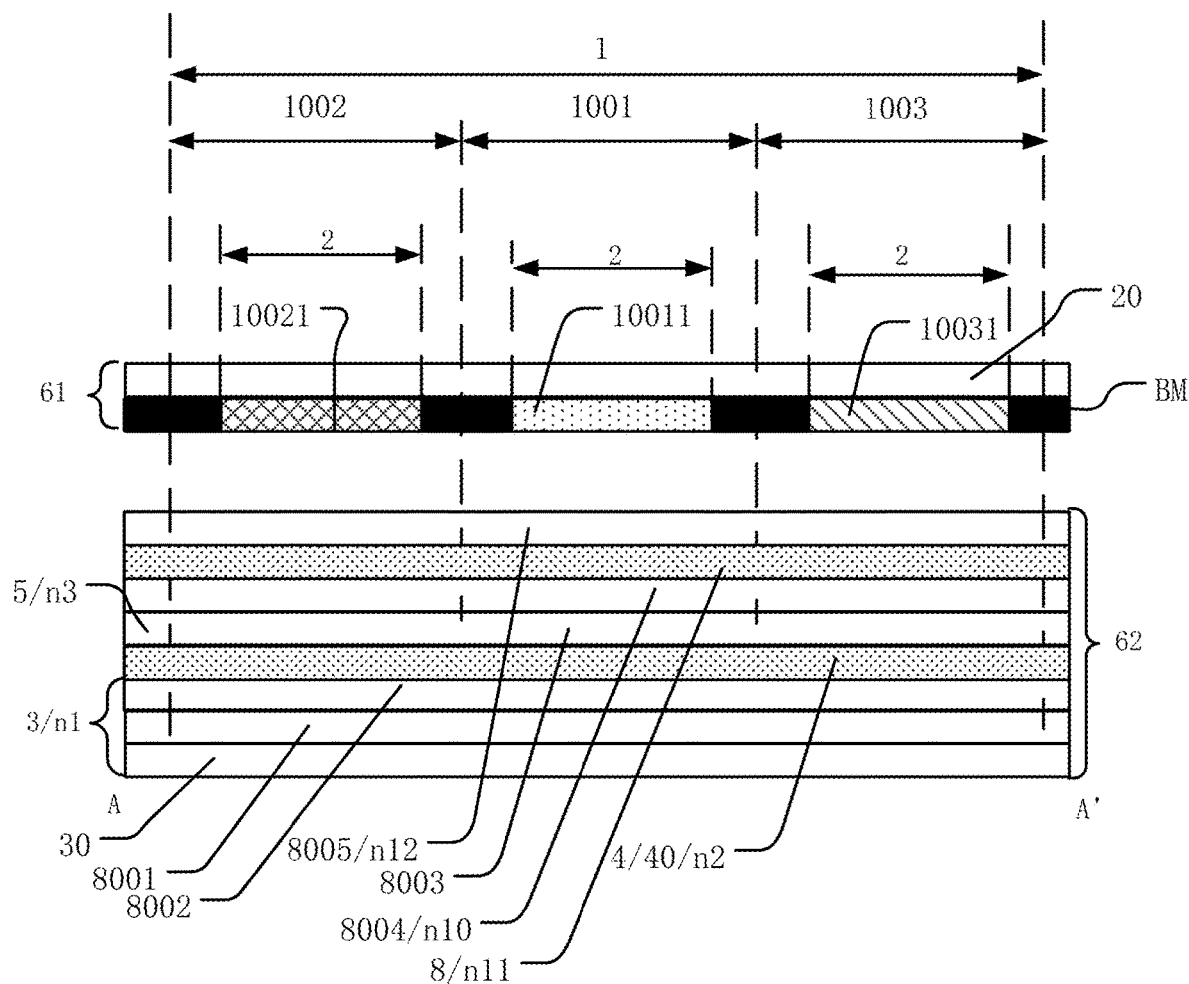
FIG. 11 illustrates another A-A'-sectional view of FIG. 1.
Figure 12:
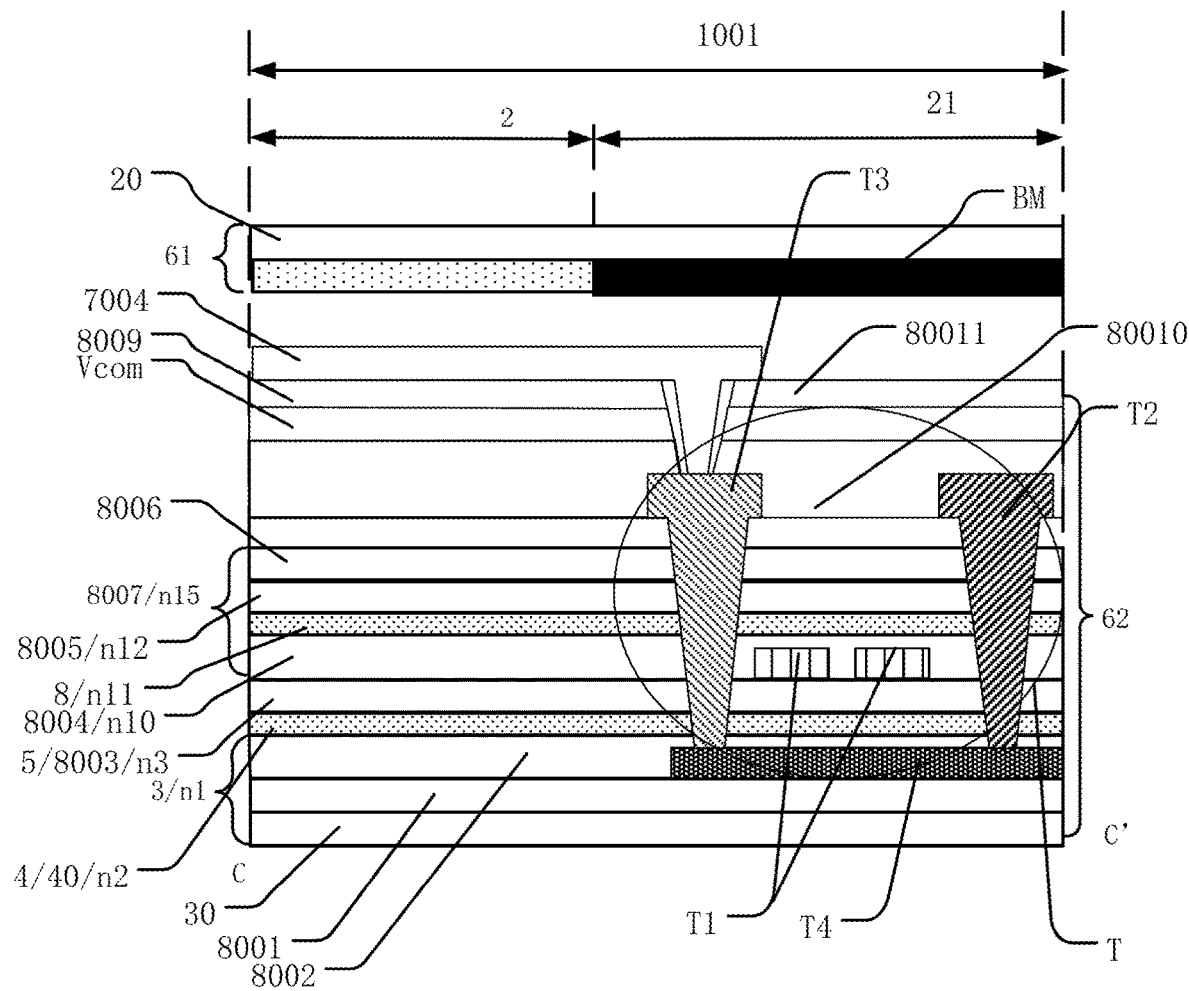
FIG. 12 illustrates another C-C'-sectional view of FIG. 4.

FIG. 11 is another exemplary A-A'-sectional view of FIG. 1, and FIG. 12 is another exemplary C-C'-sectional view of FIG. 4. As shown in FIG. 11 and FIG. 12, the light-transmitting area 2 of the first sub-pixel 1001 may further include a first interlayer insulation layer 8004 located on the side of the second sub-gate insulation layer 8003 adjacent to the light-exiting surface of the display panel 000; a sixth structure layer 8 on the side the first interlayer insolation layer 8004 adjacent to the light-exiting surface the display panel 000; and a second interlayer insulation layer 8005 on the side of the sixth structure layer 8 adjacent to the light-exiting surface of the display panel 000. The refractive index of the first interlayer insulation layer 8004 may be n10, the refractive index of the sixth structure layer 8 may be n11, the refractive index of the second interlayer insulation layer 8005 may be n12, and n10>n11>n12.

In one embodiment, the display panel 000 may use the LTPS technology.

In one embodiment, referring to FIG. 12, the first structure layer 4 may also be disposed between the first sub-gate insulation layer 8002 and the second sub-gate insulation layer 8003. In another embodiment, the first structure layer 4 may not be provided, which is not specifically limited here.

In one embodiment, the light-transmitting area 2 of the second sub-pixel 1002 and the third sub-pixel 1003 may also include a first interlayer insulation layer 8004 located on the side of the second sub-gate insulation layer 8003 adjacent to the light-exiting surface of the display panel 000; a sixth structure layer 8 located on the side of the first interlayer insulation layer 8004 adjacent to the light-exiting surface of the display panel 000; a second interlayer insulation layer 8005 located on the side of the sixth structure layer 8 adjacent to the light-exiting surface of the display panel 000.

Specifically, the material of the first interlayer insulation layer 8004 may be silicon nitride, and its refractive index may usually be 1.86. The material of the second interlayer insulation layer 8005 may be silicon oxide, and its refractive index may be 1.51. Thus, the first interlayer insulation layer 8004 and the second interlayer insulation layer 8005 may be film layers with abrupt refractive index change. At this time, a sixth structure layer 8 may be disposed between the first interlayer insulation layer 8004 and the second interlayer insulation layer 8005. The refractive index n10 of the first interlayer insulation layer 8004 may be greater than the refractive index n11 of the sixth structure layer 8, and the refractive index n11 of the sixth structure layer 8 may be greater than the refractive index n12 of the second interlayer insulation layer 8005, thus the first reflectivity at the first interlayer insulation layer 8004, the sixth structure layer 8 and the second interlayer insulation layer 8005 $r9=(n10-n11)^2/(n10+n11)^2 \times (n11-n12)^2/(n11+n12)^2$. Thus, the reflectivity may be reduced, thereby reducing the visual greening and improving the integrated black performance. If the first structure layer 4 is disposed between the first sub-gate insulation layer 8002 and the second sub-gate insulation layer 8003, then the reflectivity may be $r11=(n2-n1)^2/(n2+n1)^2 \times (n3-n2)^2/(n3+n2)^2 \times (n10-n11)^2/(n10+n11)^2 \times (n11-n12)^2/(n11+n12)^2$. $r11<r10$. Accordingly, the reflectivity may be further reduced. In one embodiment, $n10-n11=n11-n12$, the reflectivity at this time may be the minimum value, the effect of reducing the visual greening and the performance of integrated black may be the best.

FIG. 12 also shows a third interlayer insulation layer 8006 that includes a sixth insulation layer 80010 on the side of the third interlayer insulation layer 8006 away from the first substrate 30. The side of the sixth insulation layer 80010 away from the first substrate 30 may include a common electrode Vcom. A side of the common electrode Vcom away from the first substrate 30 may include a pixel electrode 7004, and a seventh insulation layer 80011 may be included between the common electrode Vcom and the pixel electrode 7004. During display, when the signal of the scan line is transmitted to the gate T1 of the transistor T, the transistor T may be turned on, the data signal transmitted by the data line may be transmitted to the pixel electrode 7004, and the voltage between the pixel electrode 7004 and the common electrode Vcom may form an electric field by which may the drive the liquid crystal molecules to be deflected.

Figure 13:
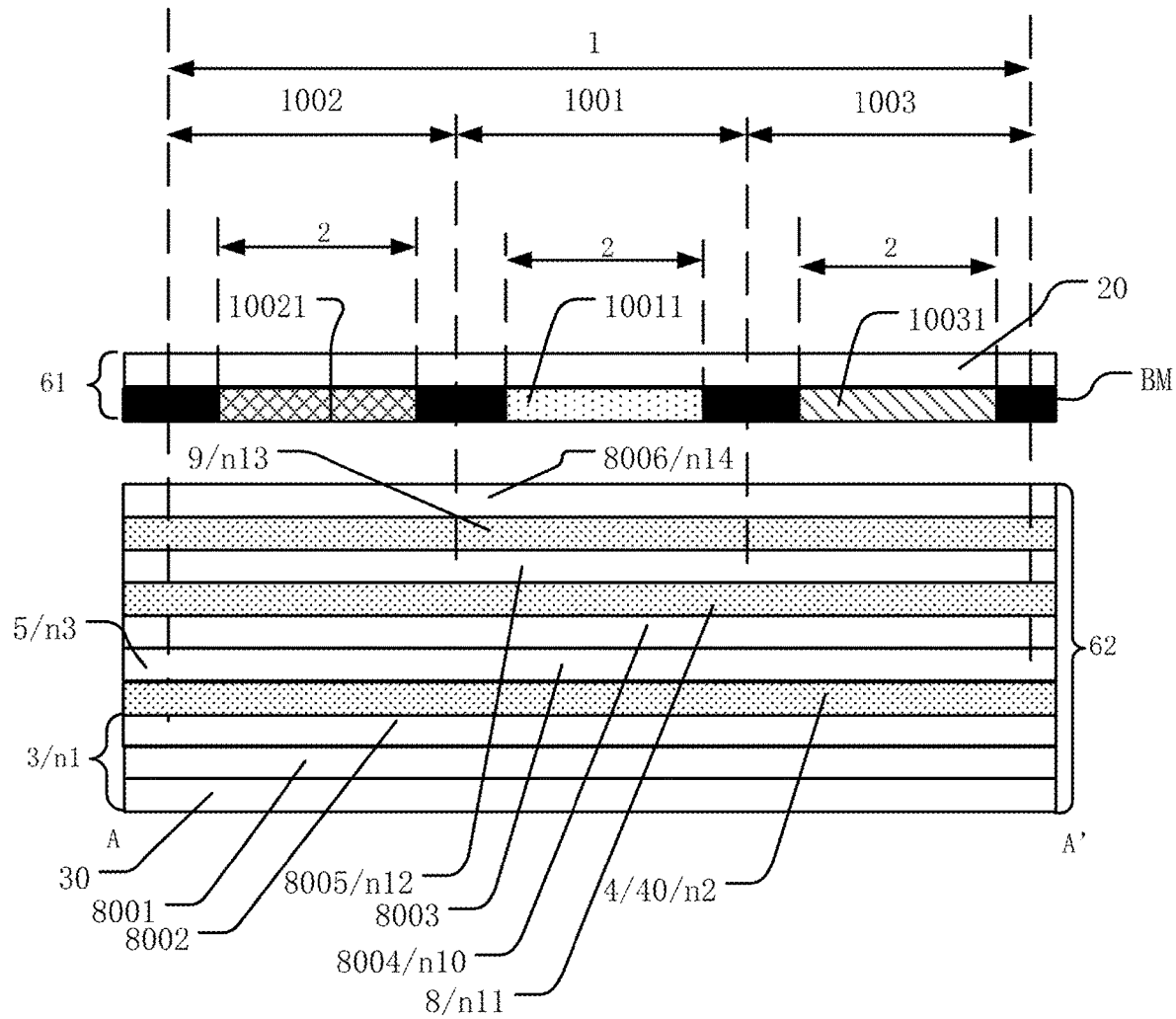
FIG. 13 illustrates another A-A'-sectional view of FIG. 1.
Figure 14:
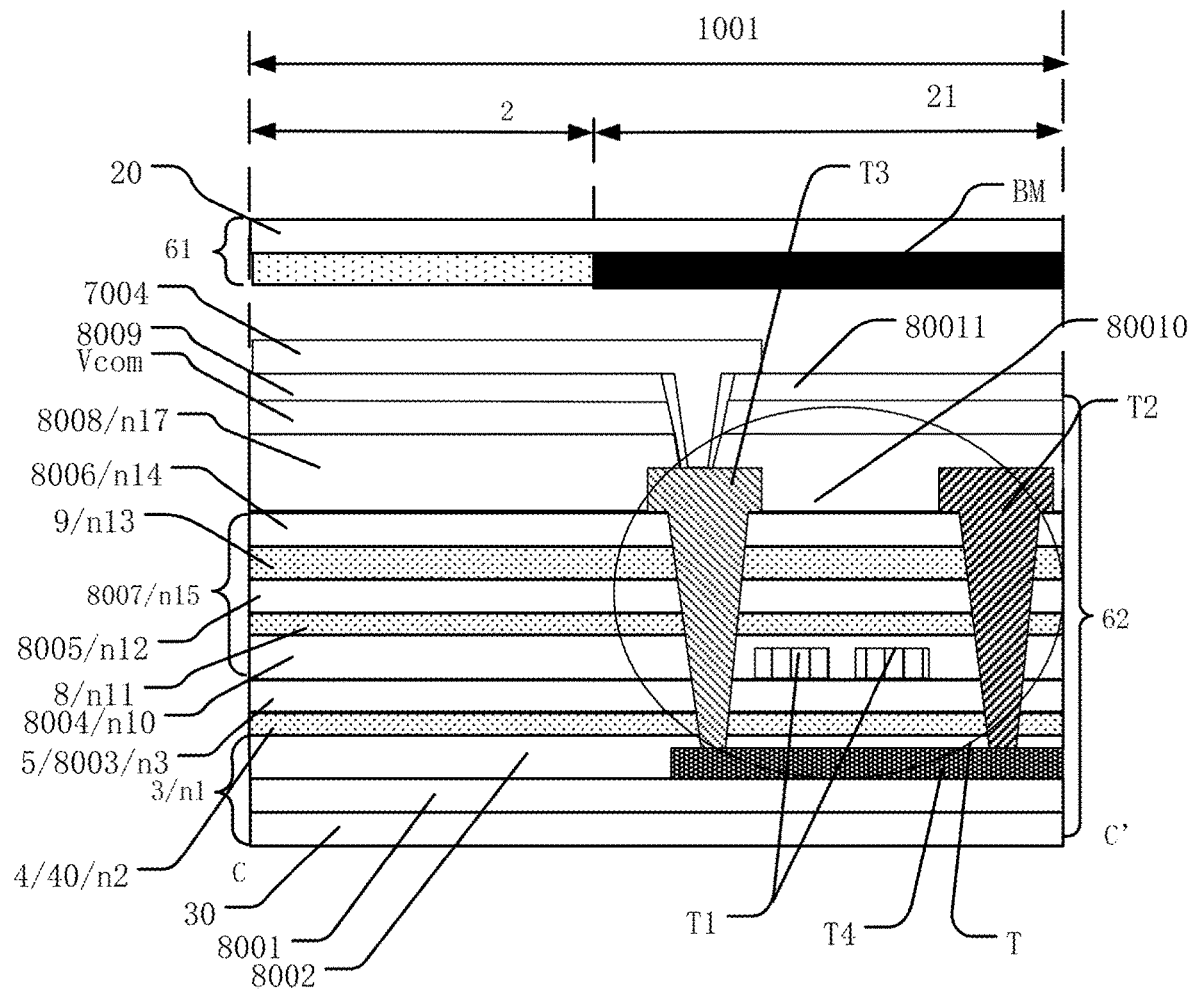
FIG. 14 illustrates another C-C'-sectional view of FIG. 4.

FIG. 13 is another exemplary A-A'-sectional view of FIG. 1, and FIG. 14 is another exemplary A-A'-sectional view of FIG. 4. As shown in FIG. 13 and FIG. 14, the light-transmitting area 2 of the first sub-pixel 1 may also include a seventh structure layer 9 located on the side of the second interlayer insulation layer 8005 adjacent to the light-emitting surface of the display panel 000; and a third interlayer insulation layer 8006 located on the side of the seventh structure layer 9 adjacent to the light-exiting surface of the display panel 000. The refractive index of the seventh structure layer 9 may be n13, the refractive index of the third interlayer insulation layer 8006 may be n14, and $n12<n13<n14$.

In one embodiment, the display panel 000 may use the LTPS technology.

In one embodiment, the first structure layer 4 may also be disposed between the first sub-gate insulation layer 8002 and the second sub-gate insulation layer 8003. In another embodiment, the first structure may not be provided, which is not specifically limited here.

In one embodiment, a sixth structure layer 8 may also be disposed between the first interlayer insulation layer 8004 and the second interlayer insulation layer 8005. In another embodiment, the sixth structure layer 8 may not be provided, which is not specifically limited here.

In one embodiment, the light-transmitting area 2 of the second sub-pixel 1002 and the third sub-pixel 1003 may also include a seventh structure layer 9 located on the side of the second interlayer insulation layer 8005 adjacent to the light-exiting surface of the display panel 000; and a third interlayer insulation layer 8006 on the side of the structure layer 9 adjacent to the light-exiting surface of the display panel 000.

Specifically, the material of the second interlayer insulation layer 8005 may be silicon oxide with a refractive index of 1.51, and the material of the third interlayer insulation layer 8006 may be silicon nitride with a refractive index of 1.86. Thus, the position of the second interlayer insulation layer 8005 and the third the third interlayer insulation layer 8006 may also be a film layer with a sudden change in refractive index, which may cause a high reflectivity. Thus, a seventh structure layer 9 may be disposed between the second interlayer insulation layer 8005 and the third interlayer insulation layer 8006. The refractive index n13 of the seventh structure layer 9 may be greater than the refractive index n12 of the second interlayer insulating layer 8005 and less than the refractive index n14 of the third interlayer insulation layer 8006, and the reflectivity $r12=(n13-n12)^2/(n13+n12)^2 \times (n14-n13)^2/(n14+n13)^2$, thereby reducing the reflectivity, reducing the visual greening, and improving the integrated black effect. In one embodiment, $n13-n12=n14-n13$, the reflectivity at this time may be the minimum value, the effect of reducing visual greening and improving the integrated black performance may be the best.

If the first structure layer 4 is disposed between the first sub-gate insulation layer 8002 and the second sub-gate insulation layer 8003, at the same time, the sixth structure layer may also be disposed between the first interlayer insulation layer 8004 and the second interlayer insulation layer 8005, then the reflectivity $r13=(n2-n1)^2/(n2+n1)^2 \times (n3-n2)^2/(n3+n2)^2 \times (n10-n11)^2/(n10+n11)^2 \times (n11-n12)^2/(n11+n12)^2 \times (n13-n12)^2/(n13+n12)^2 \times (n14-n13)^2/(n14+n13)^2$. Accordingly, the difference between r13 and r10 will be increased, r13 may be smaller than r10, and the reflectivity value may be the smallest.

Figure 15:
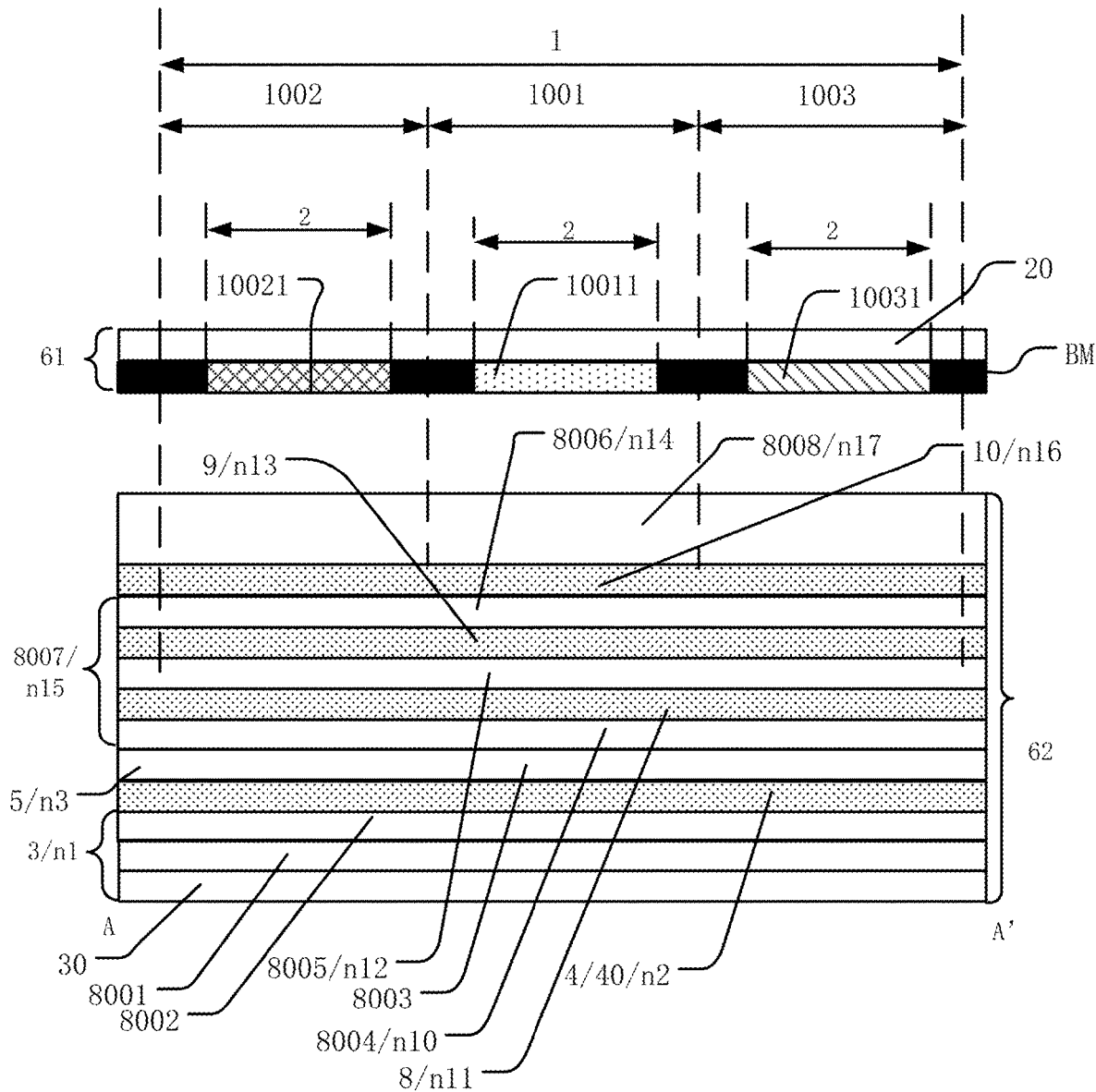
FIG. 15 illustrates another A-A'-sectional view of FIG. 1.
Figure 16:
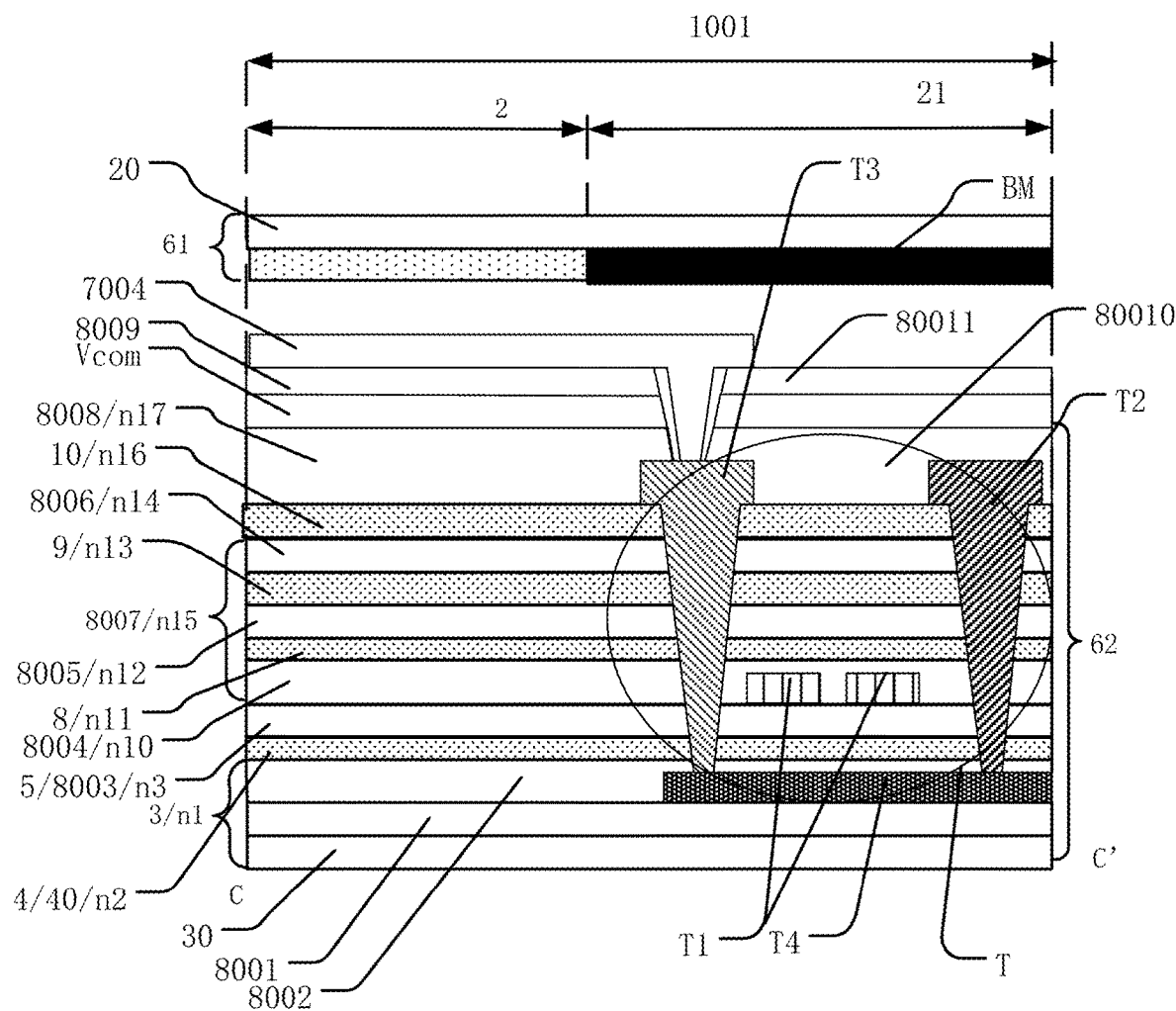
FIG. 16 illustrates another C-C'-sectional view of FIG. 4.

FIG. 15 is another exemplary A-A'-sectional view of FIG. 1, and FIG. 16 is another exemplary C-C'-sectional view of FIG. 4. As shown in FIG. 15 and FIG. 16, the light-transmitting area 2 of the first sub-pixel 1 may also include an interlayer insulation layer 8007 located on the side of the second sub-gate insulation layer 8003 adjacent to the light-exiting surface of the display panel 000; an eighth structure layer 10 located on the side of the interlayer insulation layer 8007 adjacent to the light-exiting surface of the display panel 000; and a ninth structure layer 8008 located on the side of the eighth structure layer 10 adjacent to the light-exiting surface of the display panel 000;

The average refractive index of the interlayer insulation layer 8007 may be n15, the refractive index of the eighth structure layer 10 may be n16, and the refractive index of the ninth structure layer 8008 may be n17, and $n15>n16>n17$.

In one embodiment, the display panel 000 may use the LTPS technology.

In one embodiment, the interlayer insulation layer 8007 may include sequentially a first interlayer insulation layer 8004, a second interlayer insulation layer 8005, and a third interlayer insulation layer 8006 in the direction from the first substrate 30 to the light-exiting surface of the display panel 000. A sixth structure layer 8 may be disposed between the first interlayer insulation layer 8004 and the second interlayer insulation layer 8005, and a seventh structure layer 9 may be disposed between the second interlayer insulation layer 8005 and the third interlayer insulation layer 8006.

In one embodiment, the first structure layer 4 may also be disposed between the first sub-gate insulation layer 8002 and the second sub-gate insulation layer 8003. In some embodiment, the first structure layer may not be provided, which is not specifically limited here.

In one embodiment, the light-transmitting area 2 of the second sub-pixel 1002 and the third sub-pixel 1003 may also include an interlayer insulation layer 8007 located on the side of the second sub-gate insulation layer 8003 adjacent to the light-exiting surface of the display panel 000; an eighth structure layer 10 located on the side of the interlayer insulation layer 8007 adjacent to the light-exiting surface of the display panel 000; a ninth structure layer 8008 located on the side of the eighth structure layer 10 adjacent to the light-exiting surface of the display panel 000.

It should be noted that the ninth structure layer 8008 in this embodiment may be a planarization layer, and the thickness of the planarization layer may be relatively large and may reach several thousand nanometers. The film produced by the CVD method may not meet the thickness requirement and may be unable to be used for planarization. Therefore, the ninth structural layer 8008 may be generally made of an organic material that can be coated and formed into a film. The main reason is that the organic material may have a good flat shape after film formation, may be easy to form a film, and may have a simple process. For example, a resin material may have a refractive index of 1.55. The insulation layer of the LTPS panel may usually include three layers: the first interlayer insulation layer 8004, the second interlayer insulation layer 8005 and the third interlayer insulation layer 8006. In one embodiment, the average refractive index n15 of the interlayer insulation layer 8007 may refer to the average value of the sum of the refractive indices of the first interlayer insulation layer 8004, the second interlayer insulation layer 8005 and the third interlayer insulation layer 8006. The layer farthest from the first substrate 30 in the insulation layers (the third interlayer insulation layer 8006) may be silicon nitride with a refractive index of 1.86. Thus, the interface between the insulation layer and the ninth structure layer may have a sudden change in refractive index. If the eighth structure layer 10 is disposed between the in the insulation layer and the ninth structure layer 8008 and the refractive index n16 of the eighth structure layer 10 is between the average refractive index n15 of the interlayer insulation layer 8007 and the refractive index n17 of the ninth structure layer 8008, and n15>n16>n17, the addition of the eighth structure layer 10 may reduce reflectivity. In one embodiment, n15−n16=n16−n17, the reflectivity may be the minimum value, and the effects of reducing visual greening and the performance of integrated black may be the best.

After adding the eighth structure layer 10 between the interlayer insulation layer 8007 with a abrupt refractive index and the ninth structure layer 8008, the reflectivity $r14=(n15-n16)^2/(n15+n16)^2 \times (n16-n17)^2/(n16+n17)^2$. If the first structure layer 4 is disposed between the second sub-gate insulation layer 8002 and the second sub-gate insulation layer 8003, at the same time, the sixth structure layer 8 may also be disposed between the first interlayer insulation layer 8004 and the second interlayer insulation layer 8005, and the seventh structural layer 9 may be disposed between the second interlayer insulation layer 8005 and the third interlayer insulation layer 8006, then the reflectivity of the display panel $r15=(n2-n1)^2/(n2+n1)^2 \times (n3-n2)^2/(n3+n2)^2 \times (n10-n11)^2/(n10+n11)^2 \times (n11-n12)^2/(n11+n12)^2 \times (n13-n12)^2/(n13+n12)^2 \times (n14-n13)^2/(n14+n13)^2 \times (n15-n16)^2/(n15+n16)^2 \times (n16-n17)^2/(n16+n17)^2$. Thus, r15≪r10, and r15 may be much smaller than r10. At this time, the reflectivity value may be the smallest. When the reflectivity is the smallest value, the effect of reducing visual greening and the performance of integrated black may be the best.

Figure 17:
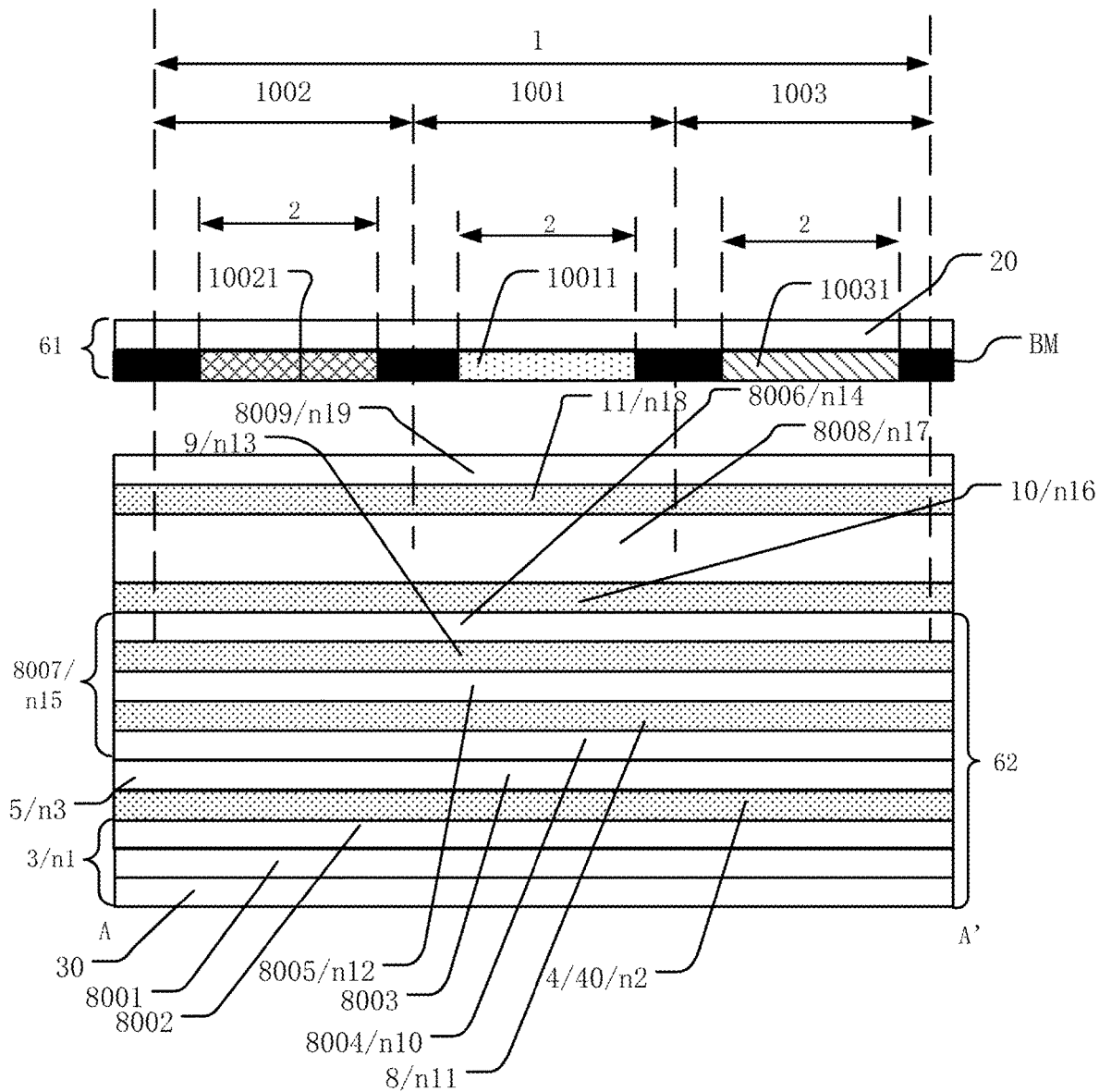
FIG. 17 illustrates another A-A'-sectional view of FIG. 1.
Figure 18:
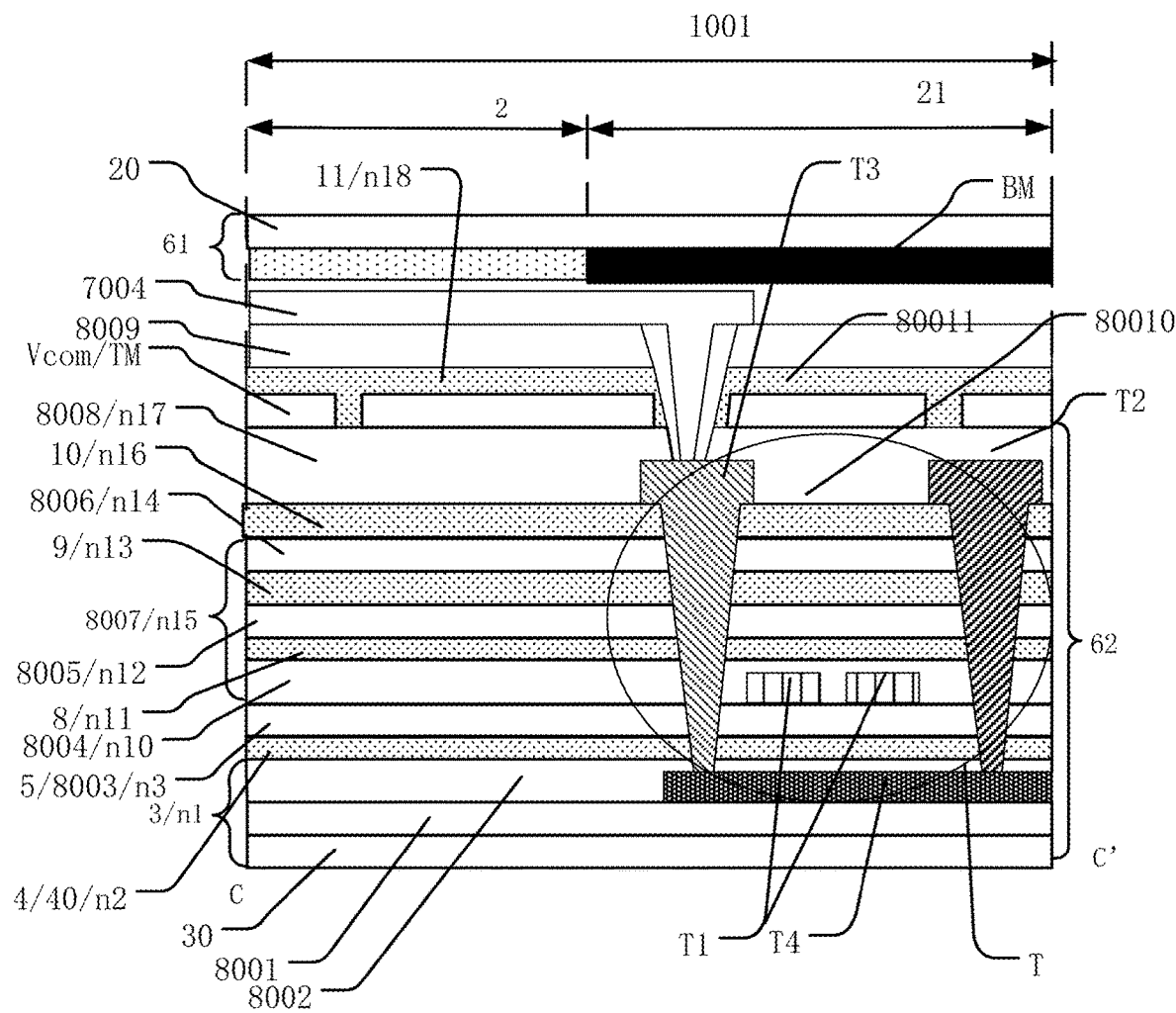
FIG. 18 illustrates another C-C'-sectional view of FIG. 4.

FIG. 17 is another exemplary A-A'-sectional of FIG. 1, and FIG. 18 is another exemplary C-C'-sectional view of FIG. 4. As shown in FIG. 17 and FIG. 18, the light-transmitting area 2 of the first sub-pixel 1001 may further include an interlayer insulation layer 8007 located on the side of the second sub-gate insulation layer 8003 adjacent to the light-exiting surface of the display panel 000, a ninth structure layer 8008 located on the side of interlayer insulation layer 8007 adjacent to the light-exiting surface the display panel 000; and a tenth structure layer 11 located on the side of the ninth structure layer 8008 adjacent to the light-exiting surface of the display panel 000, and a second insulation layer 8009 located on a side of the tenth structure layer 11 adjacent to the light-exiting surface of the display panel 000. The refractive index of the ninth structure layer 8008 may be n17, the refractive index of the tenth structure layer 11 may be n18, the refractive index of the second insulation layer 8009 may be n19, and n17<n18<n19.

In one embodiment, the display panel 000 may use the LTPS technology. In one embodiment, in the direction from the first substrate 30 to the light-exiting surface of the display panel 000, the interlayer insulation layer 8007 may sequentially include the first interlayer insulation layer 8004, the second interlayer insulation layer 8005, and the third interlayer insulation layer 8006. A sixth structure layer 8 may be disposed between the first interlayer insulation layer 8004 and the second interlayer insulating layer 8005, and a seventh structure layer 9 may be disposed between the second interlayer insulation layer 8005 and the third interlayer insulation layer 8006. In another embodiment, the sixth structure layer 8 and the seventh structure layer may not be included, and no specific limitation is made here.

In one embodiment, the first structure layer 4 may also be disposed between the first sub-gate insulation layer 8002 and the second sub-gate insulation layer 8003. In another embodiment, the first structure layer 4 may not be provided, which is not specifically limited here. In one embodiment, the light-transmitting regions 2 of the second sub-pixel 1002 and the third sub-pixel 1003 may also include an interlayer insulation layer 8007 located on the side of the second sub-gate insulation layer 8003 adjacent to the light-exiting surface of the display panel 000; an eighth structure layer 10 on the side of the interlayer insulation layer 8007 adjacent to on the light-exiting surface side of the display panel 000; a ninth structure layer 8008 located on the side of the eighth structure layer 10 adjacent to the light-exiting surface of the display panel 000.

It should be noted that this embodiment is applicable to the touch display panel 000 in the form of In-cell. In-cell may refer to a method of embedding a touch function into a liquid crystal cell. FIG. 18 also shows the touch electrode TM. The electrode TM may be multiplexed into the common electrode Vcom. At this time, the common electrode Vcom may need to be slit to be divided into blocks, and the common electrode signals and touch signals may be sent to each common electrode Vcom block in a time division. In this embodiment, the ninth structure layer 8008 may be a planarization layer, and the material of the planarization layer may be generally an organic material, such as a resin material with a refractive index of 1.55. The material of the second insulation layer 8009 may be an inorganic material, such as silicon nitride, etc. The refractive index of the second insulation layer 8009 may be 1.86. Thus, a sudden change in refractive index may occur at the interface between the ninth structure layer 8008 and the second insulation layer 8009. The addition of the tenth structure layer 11 between the ninth structure layer 8008 and the second insulation layer 8009 with a transition refractive index may reduce the reflectivity, thereby reducing the visual greening problem of the In-cell display panel 000 and improving the integrated black performance.

In some embodiments, referring to FIG. 16, the display panel 000 may further include a transistor T. The transistor T may be located in the non-transmitting area 21 of the pixel 1, and the transistor T may be used to drive the pixel electrode 7004 in the pixel 1.

The transistor T may include a gate T1, an active layer T4, a source T2 and a drain T3. The active layer T4 may be located on the side of the buffer layer 8001 away from the first substrate 30, and the gate T1 may be located a side of the active layer T4 away from the first substrate 30. A first sub-gate insulation layer 8002 and a second sub-gate insulation layer 8003 may be disposed between the gate T1 and the active layer T4. The source T2 and the drain T3 may be located at the side of the gate T1 away from the first substrate 30. An interlayer insulation layer 8007 may be disposed between the source T2 and the drain T3.

The side of the interlayer insulation layer 8007 away from the first substrate 30 may include a sixth insulation layer 80010. The sixth insulation layer 80010 may be the same layer as the ninth structure layer 8008.

The side of the sixth insulation layer 80010 away from the first substrate 30 may include the common electrode Vcom. The side of the common electrode Vcom away from the first substrate 30 may include the pixel electrode 7004. The seventh insulation layer 80011 may be disposed between the common electrode Vcom and the pixel electrode 7004. The seventh insulation layer 80011 and the second insulation layer 8009 may be in the same layer.

Specifically, FIG. 4 also shows scan lines and data lines, and FIG. 4 also shows the common electrode Vcom. The side of the sixth insulation layer 80010 away from the first substrate 30 may include the common electrode Vcom. The side of the common electrode Vcom away from the first substrate 30 may include the pixel electrode 7004. An insulation layer may be required between the pixel electrode 7004 and the common electrode Vcom. During display, the signal of the scan line may be transmitted to the gate T1 of the transistor T to turn on the transistor T; the data signal transmitted by the data line may be transmitted to the pixel electrode 7004; and the voltage between the pixel electrode 7004 and the common electrode Vcom may form an electric field that drives the liquid crystal molecules to deflect.

In one embodiment, the sixth insulation layer 80010 may be the same layer as the ninth structure layer 8008, and the seventh insulation layer 80011 may be the same layer as the second insulation layer 8009. Such a configuration may save the process flow.

Figure 19:
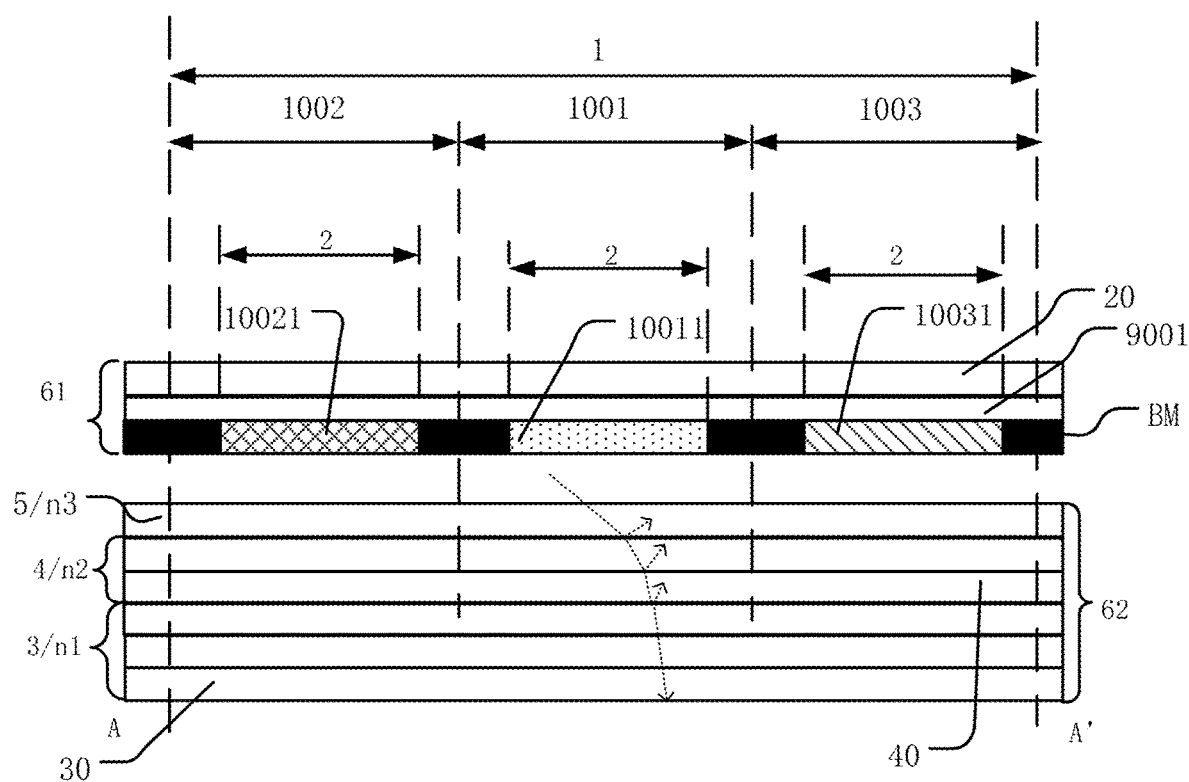
FIG. 19 illustrates another A-A'-sectional view of FIG. 1.

FIG. 19 is another exemplary A-A'-sectional view of FIG. 1. As shown in FIG. 19, in some embodiments, the first sub-pixel 1001 may include a second substrate 20; an eleventh structure layer 9001 disposed on the side of the substrate 20 adjacent to the backlight surface of the display panel 000; and a black matrix and a first color resist 10011 on the side of the eleventh structure layer 9001 adjacent to the backlight surface of the display panel 000. The black matrix may surround the first color resist 10011. The first color resist 10011 may be located in the light-transmitting area 2 of the first sub-pixel 1001, and the black matrix may be located in the non-transmitting area 21 of the first sub-pixel 1001. The refractive index of the first color resist 10011 may be n20, the refractive index of the black matrix may be n21, n20<n21. The refractive index of the eleventh structure layer 9001 may be n22, the refractive index of the second substrate 20 may be n23, n20>n22>n23, and n21>n22>n23.

This embodiment may be applicable to any of the above-mentioned embodiments. In the above-mentioned embodiments, a film layer with a refractive index transition may be disposed on the side of the array substrate 62 to the position where the refractive index changes abruptly, thereby reducing the reflectivity. The film layer with refractive index transition may be disposed to the position where the refractive index changes abruptly on one side of the color filter substrate 61.

In one embodiment, the second sub-pixel 1002 and the third sub-pixel 1003 may also include a second substrate 20; an eleventh structure layer 9001 located on the side of the second substrate 20 adjacent to the backlight surface of the display panel 000, and a black matrix BM and the first color resist 10011 located on the side of the eleventh structure layer 9001 adjacent to the backlight surface of the display panel 000. The black matrix BM may surround the first color resist 10011. The first color resist may be located the light-transmitting area 2 of the first sub-pixel 1001; and the black matrix BM may be located in the non-transmitting area 21 of the first sub-pixel 1001.

Specifically, the first color resist 10011 may be located in the light-transmitting area 2 of the first sub-pixel 1001, and the black matrix BM may be located in the non-transmitting area 21 of the first sub-pixel 1001. The material of the second substrate 20 may be glass, and its refractive index may be generally 1.51, and the refractive index of the first photoresist 10011 may be generally 1.61. Thus, the refraction may also occur at the interface between the second substrate 20 and the first color resist 10011, resulting in high reflectivity. The refractive index of the black matrix BM may usually be 1.81. Because no light may be reflected or refracted at the position of the black matrix BM after entering, the position of the black matrix BM may be ignored when calculating the reflectivity of the display panel 000. In this embodiment, an eleventh structure layer 9001 may be disposed between the second substrate and the first color resist 10011. The refractive index n22 of the eleventh structure layer 9001 may be between the refractive index n22 of the first color resist 10011 and the refractive index n23 of the second substrate 20. That is, n20>n22>n23. In some embodiments, 1.51<n22<1.61.

In one embodiment, the eleventh structure layer 9001 may be disposed on the entire surface, which may simplify the manufacturing process. In this embodiment, the eleventh structure layer 9001 of a refractive index transition layer may be disposed between the second substrate 20 and the first color resist 10011, thereby reducing the reflection at the position of the second substrate 20 and the first color resist 10011.

Figure 20:
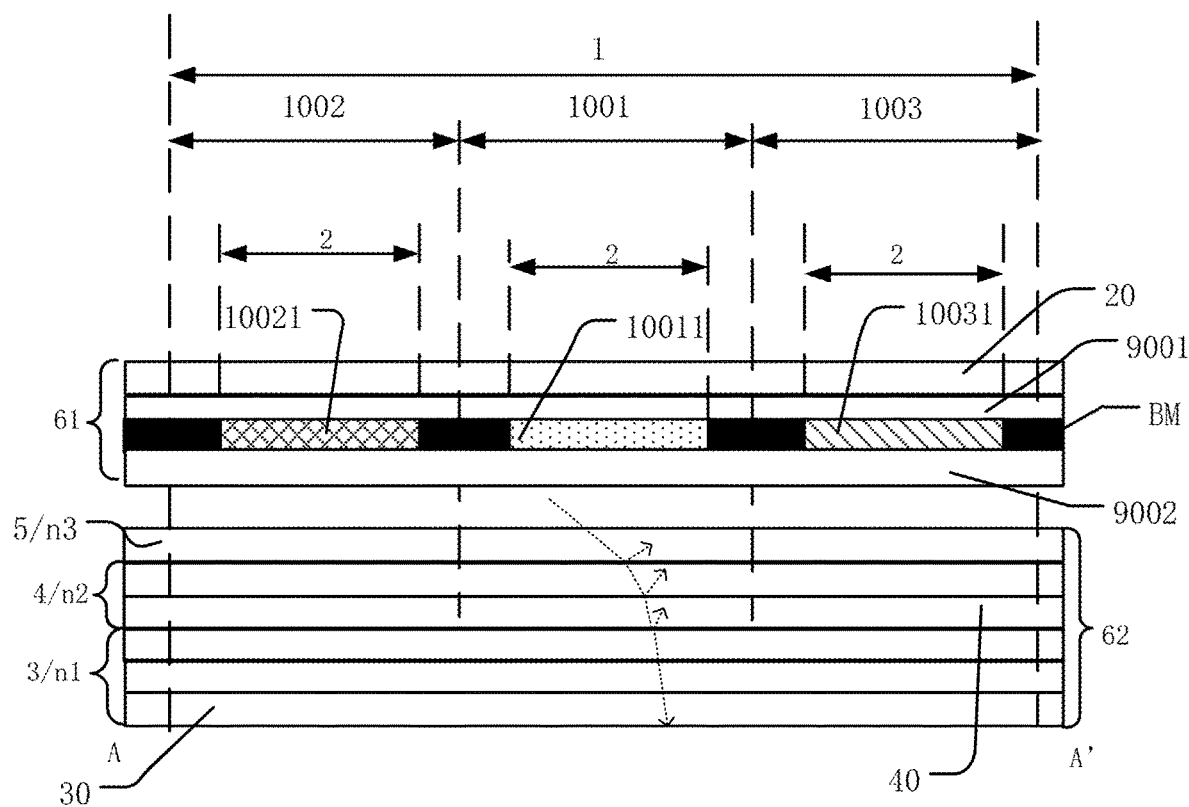
FIG. 20 illustrates another A-A'-sectional view of FIG. 1.

FIG. 20 is another exemplary A-A'-sectional view of FIG. 1. As shown FIG. 20, the light-transmitting area 2 of the first sub-pixel 1 may further include a black matrix BM and a twelfth structure layer 9002 on the side of the first color resist 10011 adjacent to the backlight side of the display panel 000. The material of the eleventh structure layer 9001 may be the same as that of the twelfth structure layer 9002.

Specifically, the twelfth structure layer 9002 may be a planarization layer, and its refractive index may be 1.56, and the refractive index value may be between 1.51 and 1.61. Thus, the eleventh structure layer 9001 may be made of the same material as the twelfth structure layer 9002. In such a configuration, no additional manufacturing process may be required to form the eleventh structure layer 9001, which may simplify the manufacturing process.

In some embodiments, referring to FIGS. 1 to 20, the material of the first structure layer 4 may include silicon oxynitride.

The first structure layer 4 in this embodiment may be applicable to any of the above-mentioned embodiments, and a material such as silicon oxynitride may be used such that the refractive index of the first structure layer 4 may be between the refractive index of the substrate structure 3 and the refractive index of the second structure layer 5, to reduce the visual greening, and improve the integrated black performance.

In some embodiments, referring FIG. 1 to FIG. 20, the weight ratio of nitrogen element to oxygen element in silicon oxynitride may be between $3/7$ and $2/3$.

In some embodiments, referring to FIGS. 1-20, the first structure layer 4 may include $Si_4ON_6$ or $Si_3ON_7$, that is, the ratio of O/N may be 4:6. In other embodiments, the ratio of O/N may also be 3:7, as long as the mass ratio of oxygen to nitrogen may be between $3/7$ and $2/3$, the refractive index of silicon oxynitride may be located between the refractive index of the substrate structure 3 and the refractive index of the second structure layer 5.

Figure 21:
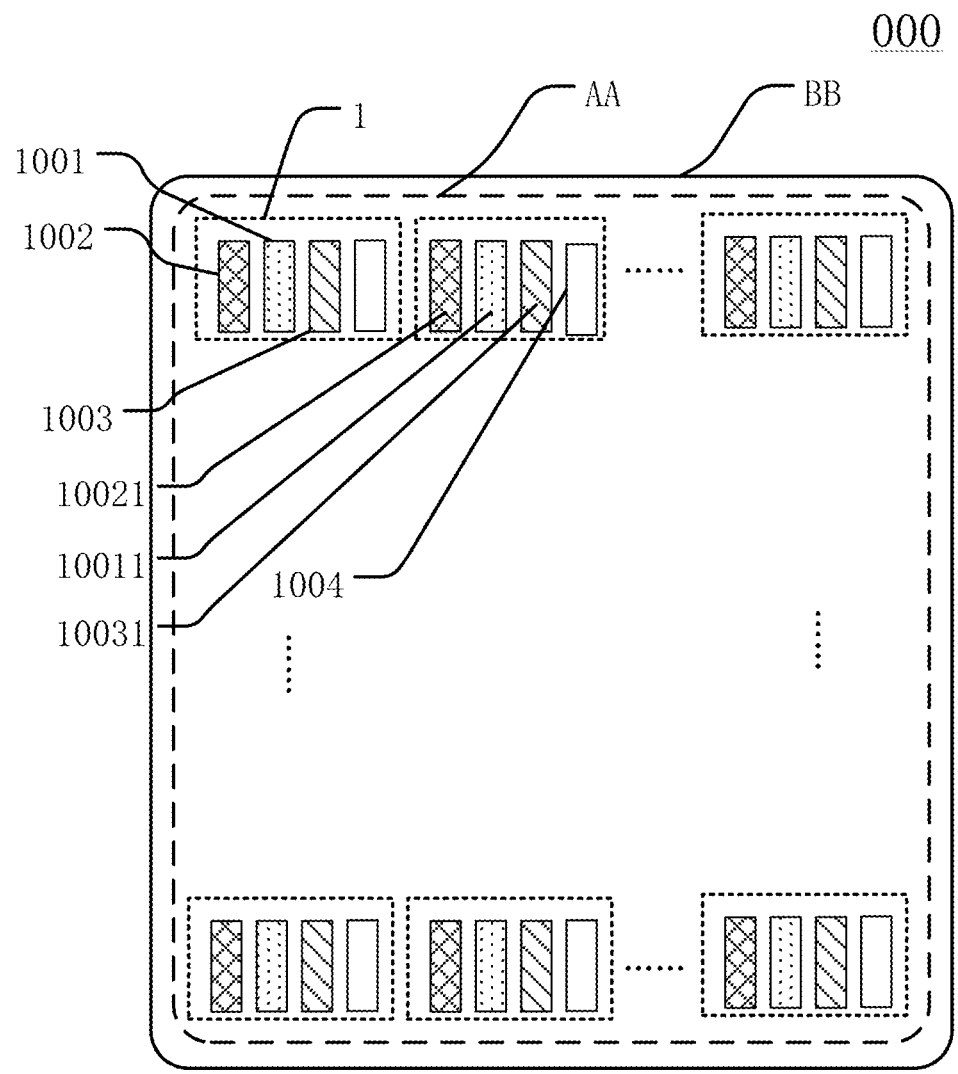
FIG. 21 illustrates another exemplary display panel according to various disclosed embodiments of the present disclosure.

FIG. 21 a schematic plan view of another exemplary display panel according to various disclosed embodiments of the present disclosure. As shown in FIG. 21, the pixel 1 may further include a fourth sub-pixel 1004. The fourth sub-pixel may be a white sub-pixel.

In one embodiment, the fourth sub-pixel 1004 is a white sub-pixel, and a color resist of any color may not need to be set in the fourth sub-pixel 1004.

The display panel 000 in this embodiment may be applicable to the display panel 000 of any one of the above-mentioned embodiments, which will not be repeated here.

The display panel 000 of the present disclosure may not only applicable to the display panel 000 having the first sub-pixel 1001, the second sub-pixel 1002, and the third sub-pixel 1003, but also is applicable to the display panel 000 having the first sub-pixel 1001, the second sub-pixel 1002, the third sub-pixel of sub-pixels 1003 and white sub-pixels.

Figure 22:
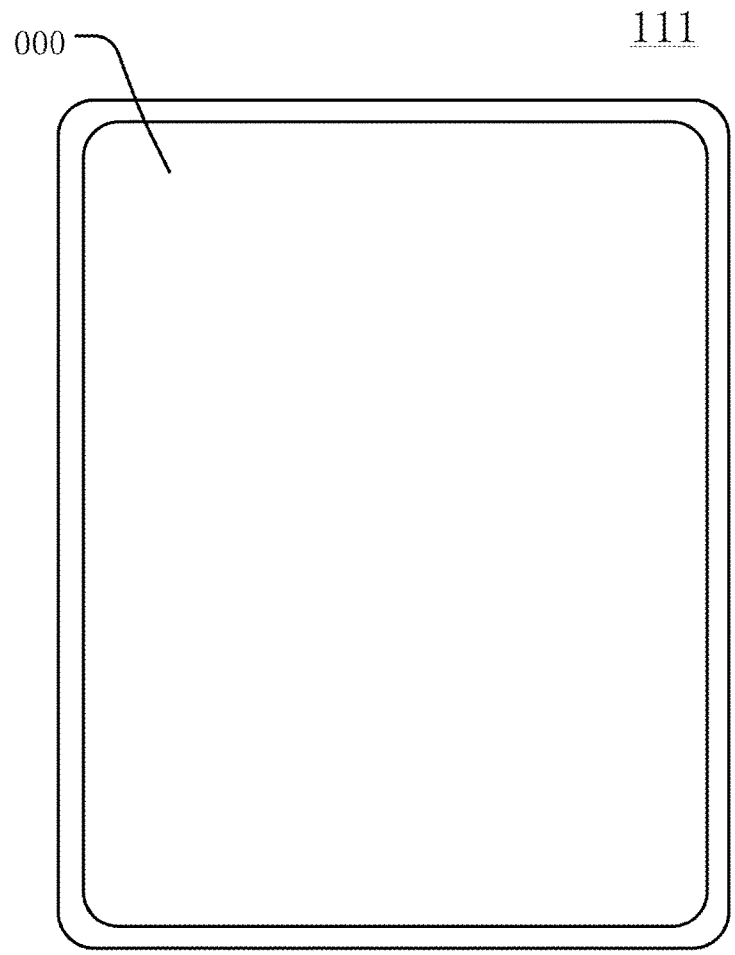
FIG. 22 illustrates an exemplary display device according to various disclosed embodiments of the present disclosure.

FIG. 22 is a schematic plan view of an exemplary display device according to various disclosed embodiments of the present disclosure. As shown in FIG. 22, the display device 111 provided by the present embodiment may include the display panel 000 provided by the above-mentioned embodiment of the present disclosure. The embodiment of FIG. 22 only takes a mobile phone as an example to describe the display device 111. It can be understood that the display device 111 provided in the embodiment of the present disclosure may be a computer, a TV, a vehicle-mounted display device, and other display devices 111 with display functions, which is not specifically limited in the present disclosure. The display device 111 provided by the embodiments of the present disclosure may have the beneficial effects of the display panel 000 provided by the embodiments of the present disclosure. For details, reference may be made to the specific description of the display panel 000 in the above embodiments, which is not repeated in this embodiment.

Figure 23:
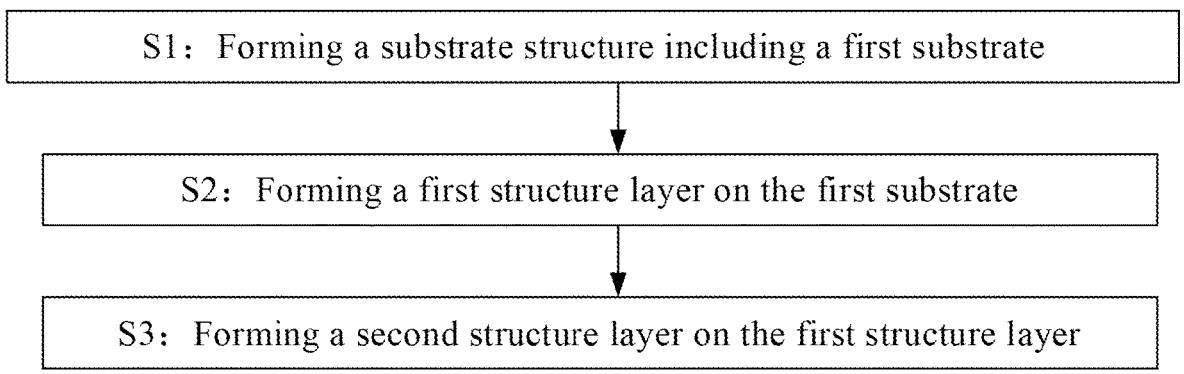
FIG. 23 illustrates an exemplary flow chart for forming a display panel according to various disclosed embodiments of the present disclosure.

The present disclosure also provides a fabrication method of a display panel. FIG. 23 is a flowchart of an exemplary fabrication method of a display panel according to various disclosed embodiments of the present disclosure. It can be understood that the display panel 000 may be the display panel 000 of any one of the above embodiments. The display panel 000 may include a plurality of pixels 1. A pixel 1 may include a light-transmitting area 2; and the pixel 1 may at least include a first sub-pixel 1001 and a second sub-pixel 1002. The first sub-pixel 1001 may be provided with a first color resist 10011, and a second color resist 10021 may be disposed in the second sub-pixel 1002. The first color resist 10011 may be a green color resist.

As shown in FIG. 23, the fabrication method may include:
S1: forming a substrate structure, the substrate structure may include a first substrate;
S2: forming a first structure layer on the first substrate by a chemical vapor deposition; and
S3: forming a second structure layer on the first structure layer.

Specifically, referring to the display panel 000 in the previous embodiments, the substrate structure 3 may include a first substrate 30, and the first substrate 30 may be made of glass. The first structure layer 4 may be formed on the first substrate 30. The first structure layer 4 may be formed by a chemical vapor deposition process. The chemical vapor deposition (CVD) process uses gaseous or vaporous substances to react in the gas phase or at the gas-solid interface to form solid deposits. For example, the material of the first structure layer 4 may be made of silicon oxynitride, and one or several gas-phase compounds or simple substances may be chemically reacted on the surface of the first substrate 30 to form the first structure layer 4. Then, the second structure layer 5 may be formed on the first structure layer 4.

By adding the first structure layer 4 with a refractive index of a transition between the substrate structure 3 and the second structure layer 5, the overall reflectivity of the display panel 000 may be reduced. Thus, the problem that the display panel 000 is visually green may be reduced. Further, because the first structure layer 4 with a refractive index transition may be disposed between the substrate structure 3 and the second structure layer 5, when the display panel 000 is at a screen-off state off, the refraction and reflection of external ambient light may be reduced. Thus, the color difference between the light-transmitting area 2 and the surrounding light-shielding area of the display panel 000 may be reduced, and the integrated black performance of the display panel 000 may be improved.

In some embodiments, referring to FIG. 1 to FIG. 21 and FIG. 23, the material of the first structure layer 4 may include silicon oxynitride, and the film forming process of the first structure layer 4 may include introducing the chamber of the chemical vapor deposition apparatus with $SiH_4$ gas, $NH_3$ gas, $N_2O$ gas and Na. The $SiH_4$ gas, $NH_3$ gas, $N_2O$ gas and Na gas may be heated simultaneously to form the deposition layer of the first structure layer 4 on the substrate structure 3.

It is understandable that in the related art, the film layer of $Si_xN$ may need to be formed. On this basis, a silicon oxynitride film may be formed by introducing $N_2O$ gas, $SiH_4$ gas, $NH_3$ gas, $N_2O$ gas and Na gas, and silicon oxynitride with targeted reflectivity may be obtained.

In some embodiments, referring to FIGS. 1 to 21 and FIG. 23, the heating temperature may be greater than or equal to 240° C. and less than or equal to 360° C., the pressure may be in a range of approximately 500 mtorr-3000 mtorr, the power may be in a range of approximately 1000 W-4000 W, and the volume flow rate of $SiH_4$ may be in a range of approximately 200 sccm-1000 sccm, the volume flow rate of $NH_3$ may be in a range of approximately 1000 sccm-2500 sccm, the volume flow rate of $N_2O$ may be in a range of approximately 1300 sccm-2500 sccm, and the volume flow rate of Na may be in a range of approximately 6000 sccm-8000 sccm.

In one embodiment, the heating temperature may be equal to 240° C., the pressure may be 500 mtorr, the power may be 1000 w, the volume flow rate of $SiH_4$ may be 200 sccm, the volume flow rate of $NH_3$ may be 1000 sccm, the volume flow rate of $N_2O$ may be 1300 sccm, and the volume flow rate of Na may be 6000 sccm.

In another embodiment, the heating temperature may be equal to 360° C., the pressure may be 3000 mtorr, the power may be 4000 W, the volume flow rate of $SiH_4$ may be 1000 sccm, the volume flow rate of $NH_3$ may be 2500 sccm, the volume flow rate of $N_2O$ may be 2500 sccm, and the volume flow rate of $N_2$ may be 8000 sccm.

In another embodiment, the heating temperature may be equal to 300° C., the pressure may be 1700 mtorr, the power may be 2500 w, the volumetric flow rate of $SiH_4$ may be 600 sccm, the volumetric flow rate of $NH_3$ may be 1700 sccm, the volumetric flow rate of $N_2O$ may be 1900 sccm, and the volumetric flow rate of $N_2$ may be 7000 sccm.

$SiH_4$ gas, $NH_3$ gas, $N_2O$ gas and $N_2$ gas may be introduced into the chamber of the chemical vapor deposition equipment, and silicon oxynitride with the targeted reflectivity may be obtained by adjusting the fabrication process.

It can be seen from the above embodiments that the display panel provided by the present disclosure may at least achieve the following beneficial effects.

In the display panel of the present disclosure, a first structure layer may be disposed between the substrate structure and the second structure layer. The substrate structure may include a first substrate. The first structure layer may include at least one first film layer. The average refractive index n2 may be between the average refractive index n1 of the substrate structure and the refractive index n3 of the second structure layer, and n1<n2<n3, such that the first structure of the refractive index transition may be set between the substrate structure and the second structure layer. The external ambient light may enter the first structure layer through the second structure layer and then enter the substrate structure. Thus, the refraction and reflection caused by the sudden change of the refractive index when the ambient light directly enters the substrate structure from the second structure layer may be reduced, thereby reducing the reflectivity of the entire display panel. It can be known from the related art that there are three reasons for the visual greenness of the display panel. The first one is that the transmittance of the green color resist in the display panel is relatively high. The green light may be more likely to be emitted from the light-exiting surface side of the display panel. The second one is that green light may be more sensitive to human eyes. The third one is that the overall reflectivity of the display panel may be relatively high. Because the refractive index difference between the second structure layer and the substrate structure layer may be relatively large, according to the calculation method of reflectivity $r=(nk2-nk1)^2/(nk2+nk1)^2$. (r, nk1, nk2 are the reflectivity and the refractive index of the second structure layer and the substrate structure layer, respectively). It can be seen that the greater the difference between the refractive indices of the second structure layer and the substrate structure layer, the higher the reflectivity. The present disclosure may form a first structure layer having a refractive index transition between the substrate structure and the second structure layer, which may reduce the overall reflectivity of the display panel. In combination with the first reason, the present disclosed structure may significantly reduce the reflection intensity of green light, and combined with the second reason, the problem of visual greening of the display panel may be reduced. Further, because the first structure layer with the refractive index transition may be disposed between the substrate structure and the second structure layer, when the display panel is in the off-screen state, the refraction and reflection of external ambient light may be reduced, and the color difference between the light-transmitting area and the surrounding light-shielding area of the display panel may be smaller, and the integrated black performance of the display panel may be improved.

Although some specific embodiments of the present disclosure have been described in detail by way of examples, those skilled in the art should understand that the above examples are provided for illustration only and not for the purpose of limiting the scope of the present disclosure. Those skilled in the art will appreciate that modifications may be made to the above embodiments without departing from the scope and spirit of the present disclosure. The scope of the disclosure is defined by the appended claims.

What is claimed is:

1. A display panel, comprising:
   a plurality of pixels, wherein a pixel of the plurality of pixels includes a light-transmitting area, the pixel at least includes a first sub-pixel, a second sub-pixel and a third sub-pixel, a first color resist is disposed in the first sub-pixel, a second color resist is disposed in the second sub-pixel, a third color resist is disposed in the third sub-pixel, and the first color resist is a green color resist;
   a substrate structure, wherein the substrate structure includes a first substrate;
   a first structure layer located on a side of the first substrate adjacent to a light-exiting surface of the display panel, wherein the first structure layer includes at least one first film layer; and
   a second structure layer located on a side of the first structure layer away from the substrate structure,
   wherein:
      the substrate structure is adjacent to and in contact with the first structure layer, and the second structure layer is adjacent to and in contact with the first structure layer; and
      an average refractive index of the substrate structure is n1, an average refractive index of the first structure layer is n2, a refractive index of the second structure layer is n3, and n1<n2<n3; and
   wherein the substrate structure further comprises:
      a buffer layer located on a side of the first substrate adjacent to the light-exiting surface of the display panel;
      a first sub-gate insulation layer located on a side of the first substrate adjacent to the light-exiting surface of the display panel, wherein the first structure layer is located on a side of the first sub-gate insulation layer adjacent to the light-exiting surface of the display panel; and
      a second sub-gate insulation layer located on a side of the first structure layer adjacent to the light-exiting surface of the display panel, wherein the second sub-gate insulation layer is the second structure layer.

2. The display panel according to claim 1, wherein: n1−n2=n2−n3.

3. The display panel according to claim 1, wherein: a difference between n1 and n3 is greater than or equal to 0.3.

4. The display panel according to claim 1, wherein: the first structure layer is disposed to cover the entire first substrate.

5. The display panel according to claim 1, wherein: the first structure layer includes a first sub-structure layer, at least one second sub-structure layer and a third sub-structure layer;
the first sub-structure layer is located on a side of the at least one second sub-structure layer adjacent to the substrate structure;
the third sub-structure sublayer is located on a side of the second sub-structure layer adjacent to the second structure layer;
a refractive index of the first structure layer is n01;
an average refractive index of the at least one second sub-structure sublayer is n02;
a refractive index of the third sub-structure layer is n03; and
n01<n02<n03.

6. The display panel according to claim 1, wherein a light-transmitting area of the first sub-pixel comprises:
a first gate insulation layer located on a side of the first structure layer adjacent to the light-exiting surface of the display panel,
wherein the first gate insulation layer includes the second structure layer.

7. The display panel according to claim 6, wherein: 1.51<n2<1.86.

8. The display panel according to claim 1, wherein a light-transmitting area of the first sub-pixel comprises:
a first gate insulation layer located on a side of the first substrate adjacent to the light-exiting surface of the display panel;
a first insulation layer located on a side of the first gate insulation layer adjacent to the light-exiting surface of the display panel;
a third structure layer located on a side of the first insulation layer adjacent to the light-exiting surface of the display panel; and
a fourth structure layer located on a side of the first insulation layer adjacent to the light-exiting surface of the display panel,
wherein a refractive index of the first insulation layer is n4, a refractive index of the third structure layer is n5, and a refractive index of the fourth structure layer is n6, and n4>n5>n6.

9. The display panel according to claim 8, wherein: 1.55<n5<1.86.

10. The display panel according to claim 1, wherein a light-transmitting area of the first sub-pixel comprises:
a first gate insulation layer located on a side of the first substrate adjacent to the light-exiting surface of the display panel;
a first insulation layer located on a side of the first gate insulation layer adjacent to the light-exiting surface of the display panel;
a fourth structure layer located on a side of the first insulation layer adjacent to the light-exiting surface of the display panel;
a fifth structure layer located on a side of the fourth structure layer adjacent to the light-exiting surface of the display panel; and
a pixel electrode located on a side of the fifth structure layer adjacent to the light-exiting surface of the display panel,
wherein a refractive index of the fourth structure layer is n6, a refractive index of the fifth structure layer is n7, a refractive index of the pixel electrode is n8, and n6<n7<n8.

11. The display panel according to claim 1, wherein a light-transmitting area of the first sub-pixel comprises:
a first interlayer insulation layer located on a side of the second sub-gate insulation layer adjacent to the light-exiting surface of the display panel;
a sixth structure layer located on a side of the first interlayer insulation layer adjacent to the light-exiting surface of the display panel; and
a second interlayer insulation layer located on a side of the sixth structure layer adjacent to the light-exiting surface of the display panel,
wherein a refractive index of the first interlayer insulation layer is n10, a refractive index of the sixth structure layer is n11, a refractive index of the second interlayer insulation layer is n12, and n10>n11>n12.

12. The display panel according to claim 11, wherein the light-transmitting area of the first sub-pixel further comprises:
a seventh structure layer located on a side of the second interlayer insulation layer adjacent to the light-exiting surface of the display panel; and
a third interlayer insulation layer located on a side of the seventh structure layer adjacent to the light-exiting surface of the display panel,
wherein a refractive index of the seventh structure layer is n13, a refractive index of the third interlayer insulation layer is n14, and n12<n13<n14.

13. The display panel according to claim 1, wherein a light-transmitting area of the first sub-pixel further comprises:
an interlayer insulation layer located on a side of the second sub-gate insulation layer adjacent to the light-exiting surface of the display panel;
an eighth structure layer located on a side of the interlayer insulation layer adjacent to the light-exiting surface of the display panel; and
a ninth structure layer located on a side of the eighth structure layer adjacent to the light-exiting surface of the display panel,
wherein an average refractive index of the interlayer insulation layer is n15, a refractive index of the eighth structure layer is n16, a refractive index of the ninth structure layer is n17, and n15>n16>n17.

14. The display panel according to claim 1, wherein a light-transmitting area of the first sub-pixel further comprises:
an interlayer insulation layer located on a side of the second sub-gate insulation layer adjacent to the light-exiting surface of the display panel;
a ninth structure layer located on a side of the interlayer insulation layer adjacent to the light-exiting surface of the display panel;
a tenth structure layer located on a side of the ninth structure layer adjacent to the light-exiting surface of the display panel; and
a second insulation layer located on a side of the tenth structure layer adjacent to the light-exiting surface of the display panel, wherein a refractive index of the ninth structure layer is n17, a refractive index of the tenth structure layer is n18, a refractive index of the second insulation layer is n19, and n17<n18<n19.

15. The display panel according to claim 14, further comprising:
a transistor,
wherein:
the transistor is located in a non-transmitting area of the pixel;
the transistor is used for driving a pixel electrode of the pixel;
the transistor includes a gate, an active layer, and a source and a drain;
the active layer is located on a side of the buffer layer away from the first substrate;
the gate is located on a side of the active layer away from the first substrate;
the first sub-gate insulation layer and the second sub-gate insulation layer are disposed between the gate and the active layer;
the source and the drain are located on a side of the gate away from the first substrate;
the interlayer insulation layer is included between the source and the drain and the gate;
a sixth insulation layer is disposed on a side of the interlayer insulation layer away from the first substrate;
the sixth insulation layer is disposed on a same layer as the ninth structure layer;
a common electrode is disposed on a side of the sixth insulation layer away from the first substrate;
the pixel electrode is disposed on a side of the common electrode away from the first substrate;
the seventh insulation layer is included between the common electrode and the pixel electrode; and
the seventh insulation layer is disposed on a same layer as the second insulation layer.

16. A display panel, comprising:
a plurality of pixels, wherein a pixel of the plurality of pixels includes a light-transmitting area, the pixel at least includes a first sub-pixel, a second sub-pixel and a third sub-pixel, a first color resist is disposed in the first sub-pixel, a second color resist is disposed in the second sub-pixel, a third color resist is disposed in the third sub-pixel, and the first color resist is a green color resist;
a substrate structure, wherein the substrate structure includes a first substrate;
a first structure layer located on a side of the first substrate adjacent to a light-exiting surface of the display panel, wherein the first structure layer includes at least one first film layer; and
a second structure layer located on a side of the first structure layer away from the substrate structure,
wherein:
the substrate structure is adjacent to and in contact with the first structure layer, and the second structure layer is adjacent to and in contact with the first structure layer; and
an average refractive index of the substrate structure is n1, an average refractive index of the first structure layer is n2, a refractive index of the second structure layer is n3, and n1<n2<n3; and
wherein the first sub-pixel further comprises:
a second substrate;
an eleventh structure layer located on a side of the second substrate adjacent to a backlight surface of the display panel; and
a black matrix and the first color resist located on a side of the eleventh structure layer adjacent the backlight surface of the display panel,
wherein:
the black matrix surrounds the first color resist;
the first color resist is located on a light-transmitting area of the first sub-pixel;
the black matrix is located in a non-transmitting area of the first sub-pixel;
a refractive index of the first color resist is n20;
a refractive index of the black matrix is n21;
n20<n21;
a refractive index of the eleventh structure layer is n22;
a refractive index of the second substrate is n23;
n20>n22>n23; and
n21>n22>n23.

17. The display panel according to claim 1, wherein:
a material of the first structure layer includes silicon oxynitride,
a weight ratio between nitrogen and oxygen in the silicon oxynitride is in a range of approximately 3/7-2/3.

18. The display panel according to claim 1, wherein the first structure layer comprises:
one of $Si_4ON_6$ and $Si_3ON_7$.

19. The display panel according to claim 1, wherein:
the second color resist is a blue color resist; and
the third color resist is a red color resist.

20. The display panel according to claim 1, wherein the pixel further comprises:
a fourth sub-pixel, wherein the fourth sub-pixel is a white sub-pixel.

21. A display device, comprising a display panel according to claim 1.

22. A display panel, comprising:
a plurality of pixels, wherein a pixel of the plurality of pixels includes a light-transmitting area, the pixel at least includes a first sub-pixel, a second sub-pixel and a third sub-pixel, a first color resist is disposed in the first sub-pixel, a second color resist is disposed in the second sub-pixel, a third color resist is disposed in the third sub-pixel, and the first color resist is a green color resist;
a substrate structure, wherein the substrate structure includes a first substrate;
a first structure layer located on a side of the first substrate adjacent to a light-exiting surface of the display panel, wherein the first structure layer includes at least one first film layer; and
a second structure layer located on a side of the first structure layer away from the substrate structure,
wherein:
the substrate structure is adjacent to and in contact with the first structure layer, and the second structure layer is adjacent to and in contact with the first structure layer; and
an average refractive index of the substrate structure is n1, an average refractive index of the first structure layer is n2, a refractive index of the second structure layer is n3, and n1<n2<n3,
wherein a light-transmitting area of the first sub-pixel comprises:
a first gate insulation layer located on a side of the first substrate adjacent to the light-exiting surface of the display panel;

a first insulation layer located on a side of the first gate insulation layer adjacent to the light-exiting surface of the display panel;
a third structure layer located on a side of the first insulation layer adjacent to the light-exiting surface of the display panel; and
a fourth structure layer located on a side of the first insulation layer adjacent to the light-exiting surface of the display panel,
wherein a refractive index of the first insulation layer is n4, a refractive index of the third structure layer is n5, and a refractive index of the fourth structure layer is n6, and n4>n5>n6, and
wherein:
a material of the fourth structure layer includes an organic material; and
a thickness of the fourth structure layer is greater than or equal to 1.5 μm and smaller than or equal to 2.5 μm.

23. The display panel according to claim 10, further comprising:
a transistor, located in a non-transmitting area of the pixel, and is electrically connected to a pixel electrode of the pixel,
wherein:
the transistor includes a gate, an active layer, a source and a drain;
the active layer is located on a side of the gate away from the first substrate;
the source and the drain are located on a side of the active layer away from the first substrate;
a third insulation layer is included between the active layer and the gate;
the third insulation layer is disposed on a same layer as the first gate insulation layer;
a fourth insulation layer and a fifth insulation layer are included between the source and the drain and the pixel electrode;
the fourth insulation layer is disposed on a same layer as the first insulation layer; and
the fifth insulation layer is disposed on a same layer as the fourth structure layer.

24. The display panel according to claim 23, wherein:
the gate is located on a side of the first gate insulation layer adjacent to the first structure layer.

25. The display panel according to claim 16, wherein the light-transmitting area of the first sub-pixel further comprises:
a twelfth structure layer disposed on a side of the black matrix and the first color resist adjacent to a backlight surface of the display panel, wherein the eleventh structure layer is made of a material same as the twelfth structure layer.

26. The display panel according to claim 25, wherein: $1.51<n22<1.61$.

* * * * *